United States Patent
Noh et al.

(10) Patent No.: US 11,457,068 B2
(45) Date of Patent: Sep. 27, 2022

(54) COMMUNICATION FORMAT FOR A WIRELESS NETWORK

(71) Applicant: NEWRACOM, INC., Lake Forest, CA (US)

(72) Inventors: Yujin Noh, Irvine, CA (US); Seung Hyeok Ahn, Irvine, CA (US); Yongsuk Hwang, Irvine, CA (US); Dae Kyun Lee, Irvine, CA (US); Jong-ee Oh, Irvine, CA (US); Jaeyoung Ryu, Irvine, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/362,559

(22) Filed: Mar. 22, 2019

(65) Prior Publication Data

US 2019/0297146 A1    Sep. 26, 2019

Related U.S. Application Data

(60) Provisional application No. 62/797,150, filed on Jan. 25, 2019, provisional application No. 62/646,844, filed on Mar. 22, 2018.

(51) Int. Cl.
*H04L 67/12* (2022.01)
*H04L 5/00* (2006.01)
*H04W 80/04* (2009.01)

(52) U.S. Cl.
CPC ............ *H04L 67/12* (2013.01); *H04L 5/0007* (2013.01); *H04W 80/04* (2013.01)

(58) Field of Classification Search
None
See application file for complete search history.

(56) References Cited

U.S. PATENT DOCUMENTS

2013/0279379 A1* 10/2013 Yang ..................... H04W 40/00
370/310
2016/0353370 A1* 12/2016 Choi ..................... H04W 48/20
(Continued)

OTHER PUBLICATIONS

Part 11: Wireless LAN Medium Access Control (MAC) and Physical Layer (PHY) Specifications, IEEE Standards 802.11, (Revision of IEEE Standard 802.11-2007), Mar. 29, 2012, pp. 1-2695, IEEE (The Institute of Electrical and Electronic Engineers, Inc.), New York, NY, USA.

(Continued)

*Primary Examiner* — Adnan Baig

(57) ABSTRACT

A method is performed by a wireless device. The method comprises receiving a predetermined number N of Orthogonal Frequency Division Multiplexing (OFDM) symbols of a PHY Protocol Data Unit (PPDU), determining, using the Nth received OFDM symbol, whether the PPDU is a PPDU according to a first wireless network standard or a PPDU according to a second wireless network standard, and decoding the PPDU according to the determined wireless network standard. The predetermined number N corresponds to either a location of a Legacy Signal (L-SIG) field in the PPDU or the location of a symbol of a second field of the second wireless network standard in the PPDU, the second field being different from the L-SIG field. The first and second wireless network standards may each be a Vehicle to Everything standard or an Intelligent Transportation System standard, and may be different from each other.

13 Claims, 12 Drawing Sheets

(56) References Cited

U.S. PATENT DOCUMENTS

2017/0311325 A1* 10/2017 Cariou ................. H04B 7/0408
2018/0123737 A1* 5/2018 Vermani ............... H04L 5/0044
2018/0132278 A1* 5/2018 Oteri ................. H04W 74/0808
2019/0165883 A1* 5/2019 Chun ................. H04L 27/2603

OTHER PUBLICATIONS

Part 11: Wireless LAN Medium Access Control (MAC) and Physical Layer (PHY) Specifications, Amendment 4: Enhancements for Very High Throughput for Operation in Bands below 6 GHz, IEEE Standards 802.11ac, 2013, pp. 1-395, IEEE (The Institute of Electrical and Electronic Engineers, Inc.), New York, NY, USA.

Part 11: Wireless LAN Medium Access Control (MAC) and Physical Layer (PHY) Specifications, Amendment 2: Sub 1 GHz License Exempt Operation, IEEE P802.11ah/D5.0, Mar. 2015, pp. 1-604, IEEE (The Institute of Electrical and Electronic Engineers, Inc.), New York, NY, USA.

* cited by examiner

Table 1:

| Element | definition | duration | DFT period | GI | Subcarrier spacing |
|---|---|---|---|---|---|
| L-STF | Non-HT Short Training field | 16 μs | - | - | |
| L-LTF | Non-HT Long Training field | 16 μs | 6.4 μs | 3.2 μs | 156.25 kHz |
| L-SIG | Non-HT SIGNAL field | 8 μs | 6.4 μs | 1.6 μs | 156.25 kHz |
| HE-DATA | DATA field | $N_{DATA}$ * (DFT period + GI)μs | 6.4 μs | 1.6 μs | 156.25 kHz |

FIG. 7

Table 2:

| Parameter | 20 MHz Channel (11a) | 10 MHz Channel (11p) |
|---|---|---|
| $N_{SD}$: Number of data subcarriers | 48 | 48 |
| $N_{DP}$: Number of pilot subcarriers | 4 | 4 |
| $N_{ST}$: Number of subcarriers, total | 52 ($N_{SD}+N_{SP}$) | 52 ($N_{SD}+N_{SP}$) |
| $\Delta_F$: Subcarrier frequency spacing | 0.3125 MHz | 0.15625 MHz |
| $T_{FFT}$: IFFT/FFT period | 3.2 μs ($1/\Delta_F$) | 6.4 μs ($1/\Delta_F$) |
| $T_{PREAMBLE}$: PHY Preamble duration | 16 μs ($T_{SHORT}+T_{LONG}$) | 32 μs ($T_{SHORT}+T_{LONG}$) |
| $T_{SIGNAL}$: Duration of the SIGNAL BPSK-OFDM symbol | 4 μs ($T_{GI}+T_{FFT}$) | 8 μs ($T_{GI}+T_{FFT}$) |
| $T_{GI}$: Guard Interval (GI) duration | 0.8 μs ($T_{FFT}/4$) | 1.6 μs ($T_{FFT}/4$) |
| $T_{GI2}$: Training Symbol GI duration | 1.6 μs ($T_{FFT}/2$) | 3.2 μs ($T_{FFT}/2$) |
| $T_{SYM}$: Symbol Interval | 4 μs ($T_{GI}+T_{FFT}$) | 8 μs ($T_{GI}+T_{FFT}$) |
| $T_{SHORT}$: Short Training Sequence duration | 8 μs (10 ×$T_{FFT}/4$) | 16 μs (10 ×$T_{FFT}/4$) |
| $T_{LONG}$: Long Training Sequence duration | 8 μs ($T_{GI2}+2\times T_{FFT}$) | 16 μs ($T_{GI2}+2\times T_{FFT}$) |

FIG. 8

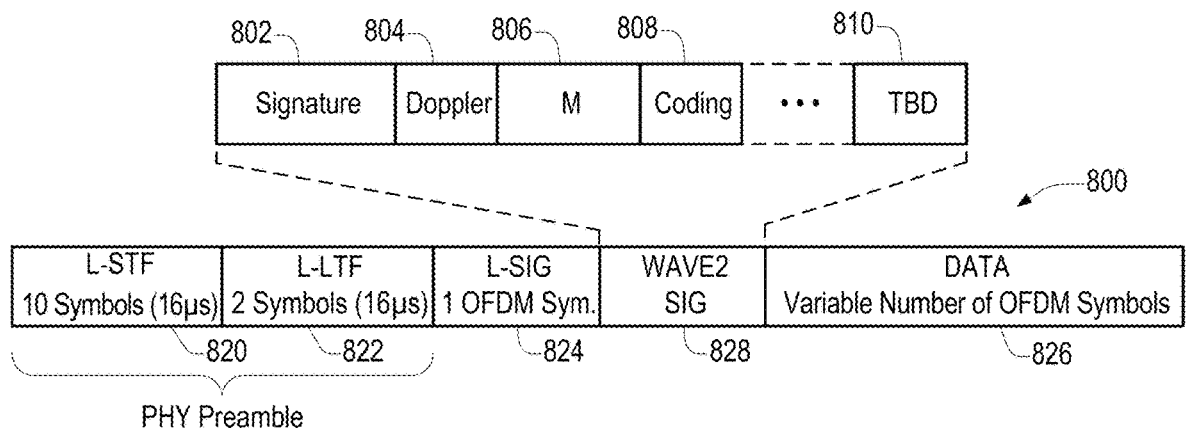

FIG. 9

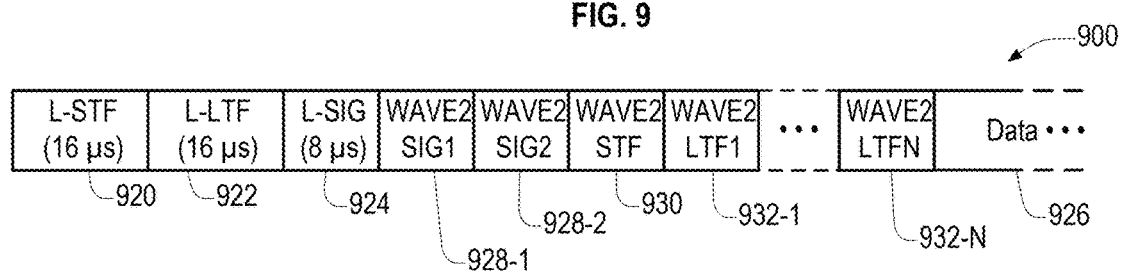

FIG. 10

| Preamble | DATA_1 | Midamble | DATA_2 | Midamble | DATA_3 |
|---|---|---|---|---|---|
| | M Data Symbols | | M Data Symbols | | M Data Symbols |

FIG. 11

| Operating Class | Global Operating Class | Channel Starting Freq. (GHz) | Channel Spacing (MHz) | Channel Set | Behavior Limits Set |
|---|---|---|---|---|---|
| 1 | 115 | 5 | 20 | 36, 40, 44, 48 | |
| 16 | – | 5.0025 | 5 | 170-184 | ITS_nonmobile_operations, ITS_mobile_operations |
| 17 | – | 5 | 10 | 171-184 | ITS_nonmobile_operations, ITS_mobile_operations |
| 18 | – | 5 | 20 | 172-183 | ITS_nonmobile_operations, ITS_mobile_operations |
| 19-21 | Reserved | | | | Reserved |

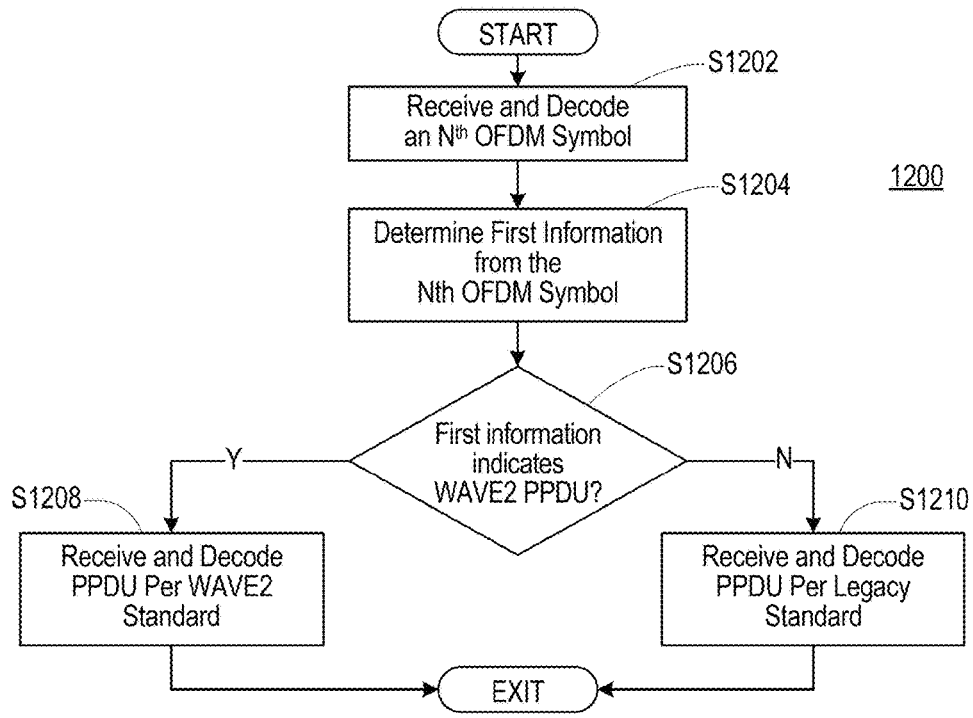

FIG. 12

Table 3:

| Seq# | Maximum 99.9% PAPR | Sequence | | | |
|---|---|---|---|---|---|
| | | k = -28 | k = -27 | k = +27 | k = +28 |
| 1 | 11.5439890169176 | 1 | 1 | 1 | 1 |
| 2 | 11.7559798669756 | -1 | 1 | 1 | 1 |
| 3 | 11.0247632082654 | 1 | -1 | 1 | 1 |
| 4 | 11.1132462729183 | -1 | -1 | 1 | 1 |
| 5 | 11.0308568688696 | 1 | 1 | -1 | 1 |
| 6 | 11.2221732344942 | -1 | 1 | -1 | 1 |
| 7 | 10.4667832783689 | 1 | -1 | -1 | 1 |
| 8 | 10.5375311035243 | -1 | -1 | -1 | 1 |
| 9 | 11.7149578452610 | 1 | 1 | 1 | -1 |
| 10 | 12.3474566483288 | -1 | 1 | 1 | -1 |
| 11 | 11.1773385196315 | 1 | -1 | 1 | -1 |
| 12 | 11.7522509687256 | -1 | -1 | 1 | -1 |
| 13 | 11.0987234304853 | 1 | 1 | -1 | -1 |
| 14 | 11.7572701498639 | -1 | 1 | -1 | -1 |
| 15 | 10.5091551858028 | 1 | -1 | -1 | -1 |
| 16 | 11.1262697705930 | -1 | -1 | -1 | -1 |

Table 4:

| Seq# | Maximum 99.0% PAPR | Sequence | | | |
|---|---|---|---|---|---|
| | | k = -28 | k = -27 | k = +27 | k = +28 |
| 1 | 10.2706106595020 | 1 | 1 | 1 | 1 |
| 2 | 10.7363331311070 | -1 | 1 | 1 | 1 |
| 3 | 9.91154468364214 | 1 | -1 | 1 | 1 |
| 4 | 10.2800161947610 | -1 | -1 | 1 | 1 |
| 5 | 10.3023893730895 | 1 | 1 | -1 | 1 |
| 6 | 10.8164062029529 | -1 | 1 | -1 | 1 |
| 7 | 9.78948896317696 | 1 | -1 | -1 | 1 |
| 8 | 10.3164094519923 | -1 | -1 | -1 | 1 |
| 9 | 10.4323041382824 | 1 | 1 | 1 | -1 |
| 10 | 10.8492531738741 | -1 | 1 | 1 | -1 |
| 11 | 10.1837859104191 | 1 | -1 | 1 | -1 |
| 12 | 10.4427769469515 | -1 | -1 | 1 | -1 |
| 13 | 10.4044340151947 | 1 | 1 | -1 | -1 |
| 14 | 10.7918292766516 | -1 | 1 | -1 | -1 |
| 15 | 9.96623421218785 | 1 | -1 | -1 | -1 |
| 16 | 10.3583786056179 | -1 | -1 | -1 | -1 |

FIG. 30
Table 5:
| Model OFDM Numerology | $N_{FFT}$ | $N_{SD}$ | Effective $N_{SD}$ | Subcarrier Spacing | Downclock Ratio |
|---|---|---|---|---|---|
| IEEE 802.11n 40MHz | 128 | 108 | 54 | 156.25KHz | 2 |
| IEEE 802.11ac 40MHz | 128 | 108 | 54 | 156.25KHz | 2 |
| IEEE 802.11ac 80MHz | 256 | 234 | 117 | 78.125 KHz | 4 |
FIG. 31
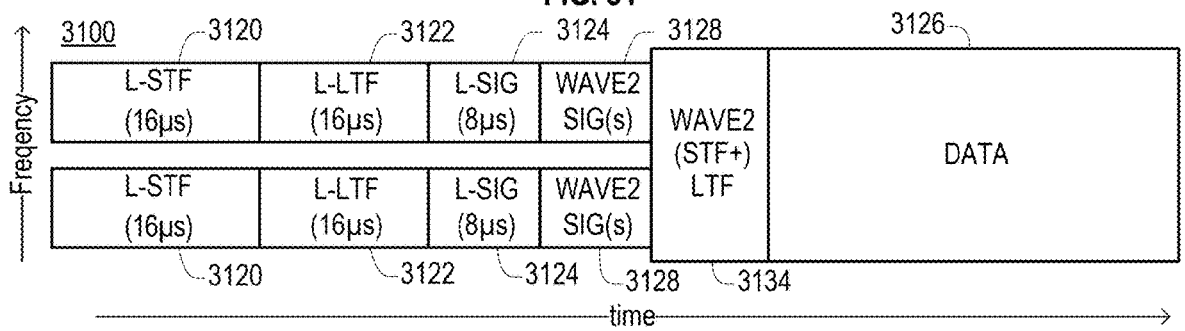
FIG. 32
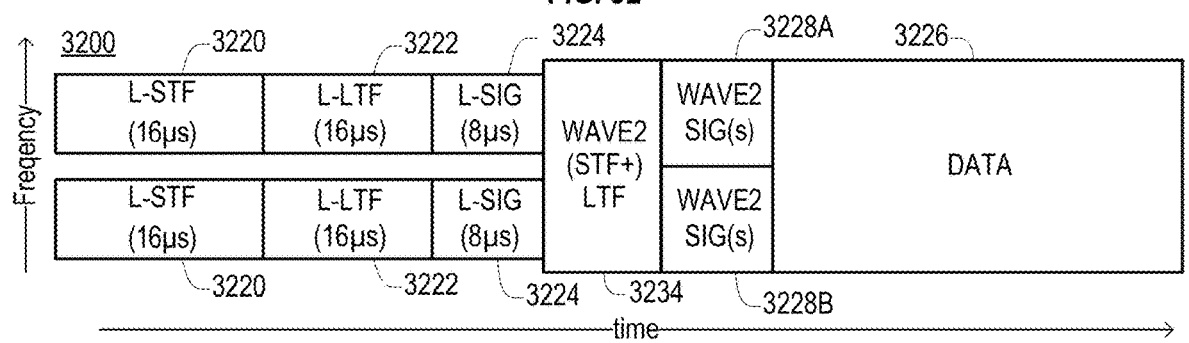
FIG. 33
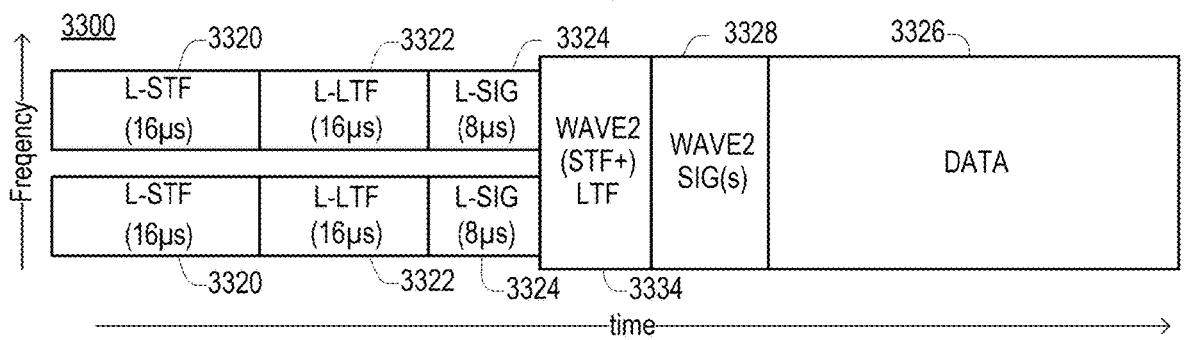

COMMUNICATION FORMAT FOR A WIRELESS NETWORK

CROSS-REFERENCE TO RELATED APPLICATION

This application claims the benefit of U.S. Provisional Patent Applications No. 62/646,844, filed Mar. 22, 2018, and No. 62/797,150, filed Jan. 25, 2019, which are incorporated by reference herein in their entirety.

BACKGROUND

1. Technical Field

The technology described herein relates generally to wireless networking. More particularly, the technology relates to structural features of a transmission (such as midambles) that are used to improve the reception of the transmission in a wireless network, such as a Vehicle-to-Everything (V2X) network.

2. Description of the Related Art

Wireless Local Area Network (WLAN) devices are currently being deployed in diverse environments. In addition, WLAN devices are increasingly required to support a variety of applications such as video, cloud access, and offloading.

WLANs are being employed for Vehicle to Everything (V2X) communications. V2X communications are part of a Direct Short Range Communication (DSRC) wireless technology. V2X systems may operate in conformance with one or more of the Institute of Electrical and Electronics Engineers (IEEE) 802.11p standard, the IEEE 1609 standards for Wireless Access in Vehicular Environments (WAVE), and the European Telecommunications Standards Institute (ETSI) Technical Committee on Intelligent Transport Systems (TC-ITS) European standards.

In some V2X or WAVE environments, channel conditions may change during the communication of a data unit. For example, when two communicating stations are moving with respect to each other, the Doppler effect (i.e., the change in frequency or wavelength of the communication observed by the receiving station as a result of the relative motion of the two stations) may alter the channel conditions, and the changes from the Doppler effect may themselves change as the relative motions and positions of the two stations change. For example, when two communicating vehicles are moving past each other in opposite directions, the relative motions may be significant, and may change from approaching to receding during a long transmission, substantially altering the effect of a Doppler effect on the reception of the transmission.

Existing V2X standards, such as IEEE 802.11p, may not provide adequate support for future applications. Additional features such as advanced coding, varying symbol duration, different guard intervals (GIs), higher data rate and a method to deal with high Doppler environment may be desired. A Physical layer Protocol Data Unit (PPDU) able to support one or more of such features as well as high throughput and reliable performance may also be desired.

SUMMARY

In an embodiment, a method is performed by a wireless device. The method comprises receiving a predetermined number N of Orthogonal Frequency Division Multiplexing (OFDM) symbols of a PHY Protocol Data Unit (PPDU), determining, using the Nth received OFDM symbol, whether the PPDU is a PPDU according to a first wireless network standard or a PPDU according to a second wireless network standard, and decoding the PPDU according to the determined wireless network standard. The predetermined number N corresponds to either a location of a Legacy Signal (L-SIG) field in the PPDU or the location of a symbol of a second field of the second wireless network standard in the PPDU, the second field being different from the L-SIG field.

In an embodiment, the predetermined number N corresponds to the location of the L-SIG field, the PPDU is determined to be a PPDU according to the first wireless network standard when a value of a LENGTH field of the L-SIG field modulo 3 is equal to 0, and the PPDU is determined to be a PPDU according to the second wireless network standard when a value of a LENGTH field of the L-SIG field modulo 3 is not equal to 0.

In an embodiment, the predetermined number N corresponds to the location of the symbol of the second field, and the PPDU is determined to be a PPDU according to the second wireless network standard using first information included in the symbol of the second field.

In an embodiment, the first information is a signature field of the second field.

In an embodiment, the first information is a bandwidth field of the second field.

In an embodiment, the method further comprises when the PPDU is a PPDU according to the second wireless network standard, selecting, using second information included in the symbol of the second field, a type of the PPDU from among of a plurality of types of PPDU of the second wireless network standard and decoding the PPDU according to the determined type.

In an embodiment, the predetermined number N corresponds to the location of the symbol of the second field, and the PPDU is determined to be a PPDU according to the second wireless network standard in response to a modulation scheme of the second field is different from a modulation scheme of the L-SIG field.

In an embodiment, the method further comprises when the PPDU is a PPDU according to the second wireless network standard, selecting, using first information included in the symbol of the second field, a type of the PPDU from among of a plurality of types of PPDU of the second wireless network standard and decoding the PPDU according to the determined type.

In an embodiment, the first wireless network standard includes data symbols having a first total number of data subcarriers in a predetermined bandwidth, the second wireless network standard includes data symbols having a second total number of data subcarriers in the predetermined bandwidth, and the second total number is greater than the first total number.

In an embodiment, the first wireless network standard is a Vehicle to Everything standard or an Intelligent Transportation System standard, and the second wireless network standard is a Vehicle to Everything standard or an Intelligent Transportation System standard.

In an embodiment, a wireless device comprises a receiver and a processor. The processor configured to perform receiving a predetermined number N of Orthogonal Frequency Division Multiplexing (OFDM) symbols of a PHY Protocol Data Unit (PPDU), determining, using the Nth received OFDM symbol, whether the PPDU is a PPDU according to a first wireless network standard or a PPDU according to a second wireless network standard, and decoding the PPDU according to the determined wireless network standard. The predetermined number N corresponds to either the location of a Legacy Signal (L-SIG) field in the PPDU or the location of a symbol of a second field of the second wireless network standard in the PPDU, the second field being different from than the L-SIG field.

In an embodiment, the predetermined number N corresponds to the location of the L-SIG field, the PPDU is determined to be a PPDU according to the first wireless network standard when a value of a LENGTH field of the L-SIG field modulo 3 is equal to 0, and the PPDU is determined to be a PPDU according to the second wireless network standard when a value of a LENGTH field of the L-SIG field modulo 3 is not equal to 0.

In an embodiment, the predetermined number N corresponds to the location of the symbol of the second field, and the PPDU is determined to be a PPDU according to the second wireless network standard using first information included in the symbol of the second field.

In an embodiment, the first information is a signature field of the second field.

In an embodiment, the first information is a bandwidth field of the second field.

In an embodiment, the processor is further configured to perform when the PPDU is a PPDU according to the second wireless network standard, selecting, using second information included in the symbol of the second field, a type of the PPDU from among of a plurality of types of PPDU of the second wireless network standard and decoding the PPDU according to the determined type.

In an embodiment, the predetermined number N corresponds to the location of the symbol of the second field, and the PPDU is determined to be a PPDU according to the second wireless network standard in response to a modulation scheme of the second field is different from a modulation scheme of the L-SIG field.

In an embodiment, the processor is further configured to perform when the PPDU is a PPDU according to the second wireless network standard, selecting, using first information included in the symbol of the second field, a type of the PPDU from among of a plurality of types of PPDU of the second wireless network standard and decoding the PPDU according to the determined type.

In an embodiment, the first wireless network standard includes data symbols having a first total number of data subcarriers in a predetermined bandwidth, the second wireless network standard includes data symbols having a second total number of data subcarriers in the predetermined bandwidth, and the second total number is greater than the first total number.

In an embodiment, the first wireless network standard is a Vehicle to Everything standard or an Intelligent Transportation System standard, and the second wireless network standard is a Vehicle to Everything standard or an Intelligent Transportation System standard.

BRIEF DESCRIPTION OF THE DRAWINGS

FIG. 7 shows a Table 2 comparing properties of two networking standards having different channel bandwidths.
FIG. 8 illustrates a PPDU, according to an embodiment.
FIG. 9 illustrates a PPDU, according to another embodiment.
FIG. 10 illustrates a PPDU including midambles, according to an embodiment.
FIG. 11 illustrates qualities of wireless communication operating classes
FIG. 12 illustrates a process for determining a type of a PPDU, according to an embodiment.
FIG. 30 illustrates a PPDU in a 20 MHz channel, according to another embodiment.
FIG. 31 illustrates a PPDU in a 20 MHz channel, according to another embodiment.
FIG. 32 illustrates a PPDU in a 20 MHz channel, according to another embodiment.

FIG. 33 illustrates a PPDU in a 20 MHz channel, according to another embodiment.

DETAILED DESCRIPTION

Figure 1:
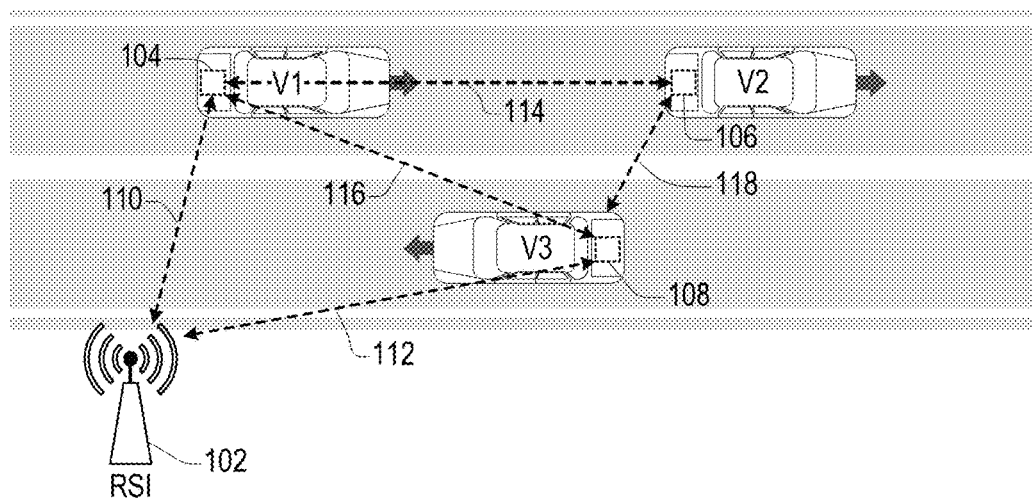
FIG. 1 illustrates a Vehicle to Everything (V2X) wireless network, according to an embodiment.

The technology described herein relates generally to wireless networking. More particularly, the technology relates to communication of Physical layer Protocol Data Units (PPDUs), including data fields, wherein the data field include midambles.

In the following detailed description, certain illustrative embodiments have been illustrated and described. As those skilled in the art would realize, these embodiments are capable of modification in various different ways without departing from the scope of the present disclosure. Accordingly, the drawings and description are to be regarded as illustrative in nature and not restrictive. Like reference numerals designate like elements in the specification.

FIG. 1 illustrates Vehicle to Everything (V2X) wireless communications, wherein a first vehicle V1, a second vehicle V2, and a third vehicle V3 communicate with each other and with a Road Side Infrastructure (RSI) 102. The first and second vehicles V1 and V2 are traveling left to right, and the third vehicle V3 is traveling right to left. The RSI 102 is stationary.

The first vehicle V1 includes a first station (STA) 104 for communicating in the V2X wireless network. The second vehicle V2 includes a second STA 106 for communicating in the V2X wireless network. The third vehicle V3 includes a third STA 108 for communicating in the V2X wireless network. Each of the first, second, and third STAs 104, 106, and 108 and the RSI 102 may communicate in the V2X wireless network according to an IEEE 802.11 wireless standard.

Because the first vehicle V1 is traveling at nearly a right angle to a first communication 110 between the first station 104 and the RSI 102, changes in the channel conditions due to a Doppler effect may initially be small. But as the first vehicle V1 continues to move, channel conditions may change as the angle of the transmission relative to the first vehicle V1 and to the RSI 102 changes (for example, as a result of beam widths and directions of the antennas thereof), the distance changes) and the Doppler effect may increase. Similarly, as the third vehicle V3 approaches the RSI 102, because of the changes in angle and relative velocity between the two, the channel conditions for the second communication 112 between the RSI 102 and the third STA 108 may change because of changes in the Doppler effect, the decreased distance, and the beam widths and directions of the RSI 102 and the third STA 108.

Because the first vehicle V1 is traveling in the same direction and at nearly the same speed as the second vehicle V2, the third communication 114 may not see much change in channel conditions because of changes in the Doppler effect, attenuation due to distance, or beam width and direction. However, as the first and second vehicles V1 and V2 travel, changes in the surrounding environment (for example, if they enter a tunnel that causes multipath transmissions) may change the channel conditions during the transmission 114.

A fourth communication 116 between the first STA 104 of the first vehicle V1 and the third STA 108 of the third vehicle V3 may experience changes in the channel conditions for the same reasons as the second communication 112, but to a higher degree because of the higher relative velocity between the first vehicle V1 and the third vehicle V3 as they are traveling in opposite directions. This is also the case for a fifth communication 118 between the second STA 106 of the second vehicle V2 and the third STA 108 of the third vehicle V3. The first to third vehicles V1, V2, and V3 may be traveling at velocities as high as 200 km/h or more.

Accordingly, devices designed for V2X application should be able to work well in rapidly varying communication environments. Additionally, while devices for V2X application should be able to work in dense urban environments, they should also have utility in rural areas, and therefore should have communication ranges up to 1 km.

Similar to IEEE Std 802.11a, the IEEE Std 802.11p specification supports Orthogonal Frequency Division Multiplexing (OFDM) communication using 64 subcarriers. After excluding a DC and guard tones, 52 carriers remain, comprising 48 data subcarriers and 4 pilot subcarriers. The pilot subcarriers transmit a fixed pattern that a receiver may use to measure frequency and phase offset. Each of the 48 data subcarriers can be modulated with Binary Phase Shift Keying (BPSK), Quadrature Phase Shift Keying (QPSK), 16-point Quadrature Amplitude Modulation (16-QAM) or 64-QAM.

In contrast to IEEE 802.11a, IEEE 802.11p uses a half clocked mode with a 10 MHz bandwidth, in order to make the signal more robust against fading, resulting in corresponding data rate reduction compared to IEEE 802.11a. IEEE 802.11p supports Binary Convolution Coding (BCC) for Forward Error Correction (FCC) and one spatial stream.

Each of the stations 104 to 108 and the RSI 102 includes a processor and one or more transceiver circuits, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium.

The transceiver represents a unit functionally connected to the processor, and designed to transmit and receive a frame through the wireless network. The transceiver may include a single component that performs the functions of transmitting and receiving, or two separate components each performing one of such functions.

The processor and transceiver of the stations 104, 106, and 108 and the RSI 102 may be respectively implemented using hardware components, software components, or both.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to a higher layer of the communication protocol stack.

A type and subtype of a frame may be identified using a type field and/or a subtype field included in a control field of the frame, as prescribed in the applicable standard.

Figure 2:
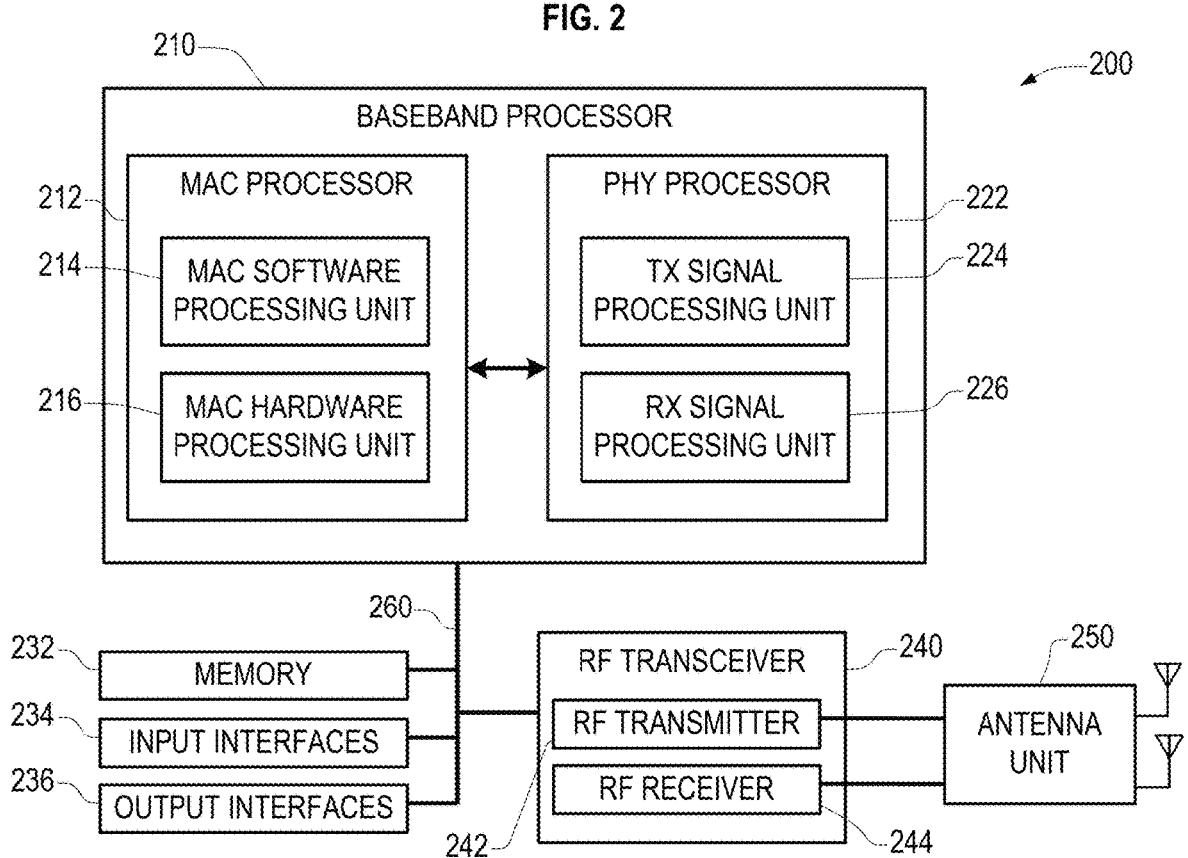
FIG. 2 is a schematic diagram of a wireless device, according to an embodiment.

FIG. 2 illustrates a schematic block diagram of a wireless device 200 according to an embodiment. The wireless or WLAN device 200 may be included in the RSI 102 or any of the stations 104, 106, or 108 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a Media Access Control (MAC) processor 212 and a Physical layer (PHY) processor 222. The baseband processor 210 may utilize the memory 232, which may include a non-transitory computer readable medium having software (e.g., computer programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the memory 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
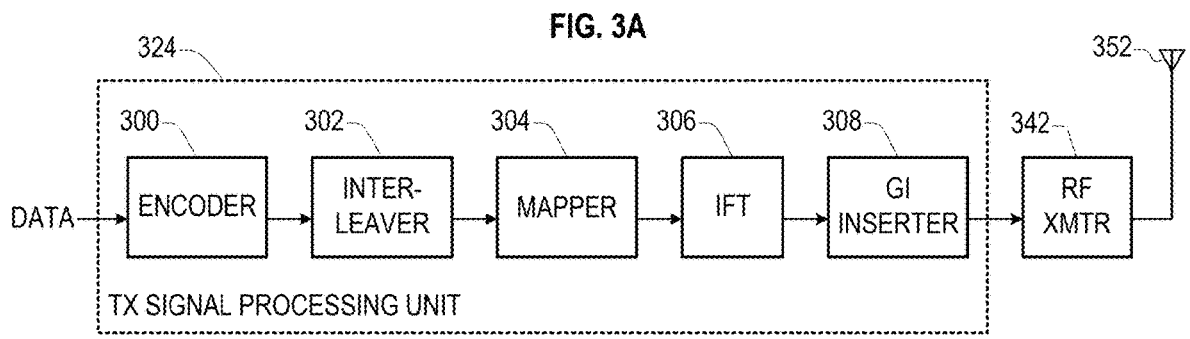
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
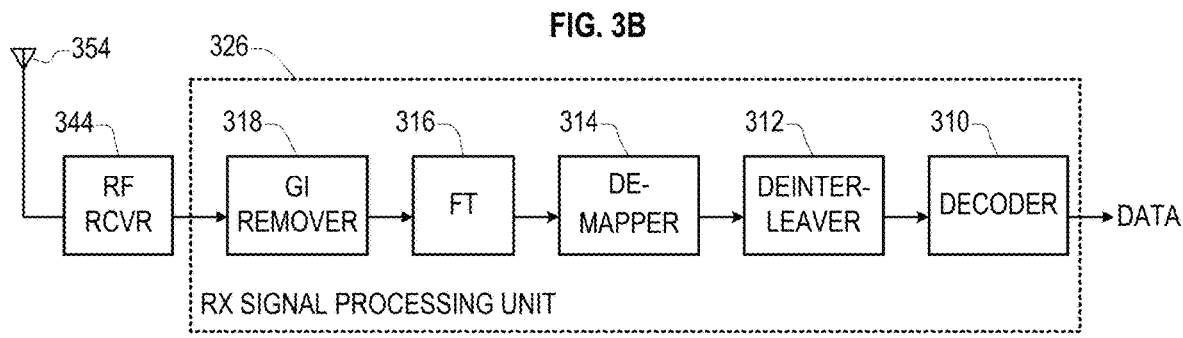
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving Physical Layer Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs.

Figure 4:
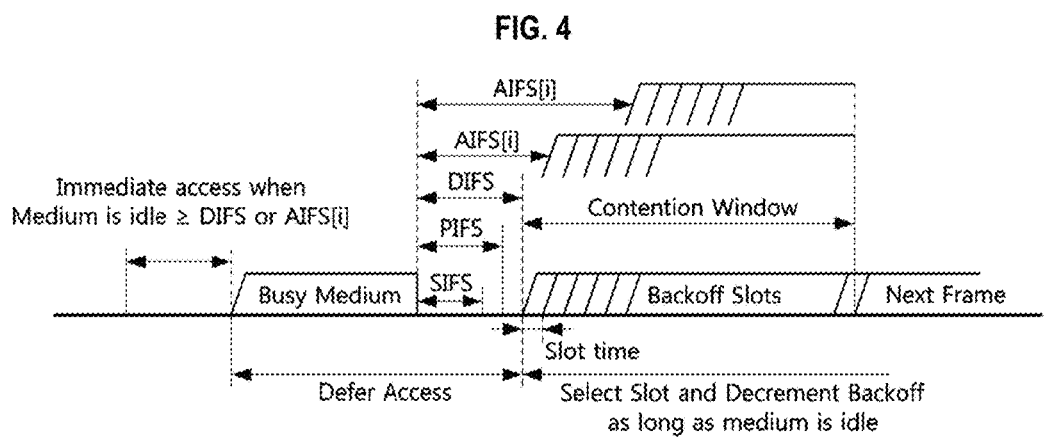
FIG. 4 illustrates Inter-Frame Space (IFS) relationships

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
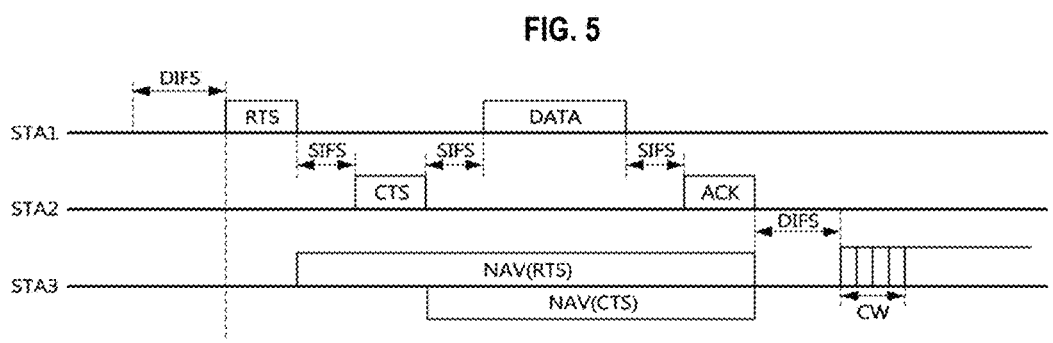
FIG. 5 illustrates a Carrier Sense Multiple Access/Collision Avoidance (CSMA/CA) based frame transmission procedure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame. If Dual-CTS is enabled and the second station STA2 is an Access Point (AP), the AP may send two CTS frames in response to the RTS frame: a first CTS frame in the legacy non-HT format, and a second CTS frame in the HT format.

When the third station STA3 receives the RTS frame, it may set a NAV timer of the third station STA3 for a transmission duration of subsequently transmitted frames (for example, a duration of SIFS+CTS frame duration+SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame.

FIG. 5 shows the second station STA2 transmitting an ACK frame to acknowledge the successful reception of a frame by the recipient.

The PHY entity for IEEE Std 802.11 is based on Orthogonal Frequency Division Multiplexing (OFDM) or Orthogonal Frequency Division Multiple Access (OFDMA). In either OFDM or OFDMA Physical (PHY) layers, a STA is capable of transmitting and receiving PHY Protocol Data Units (PPDUs) that are compliant with the mandatory PHY specifications.

A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones.

A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated.

The descriptions below, for sake of completeness and brevity, refer to OFDM-based 802.11 technology. Unless otherwise indicated, a station refers to a non-AP STA.

Figures 6A, 6B:
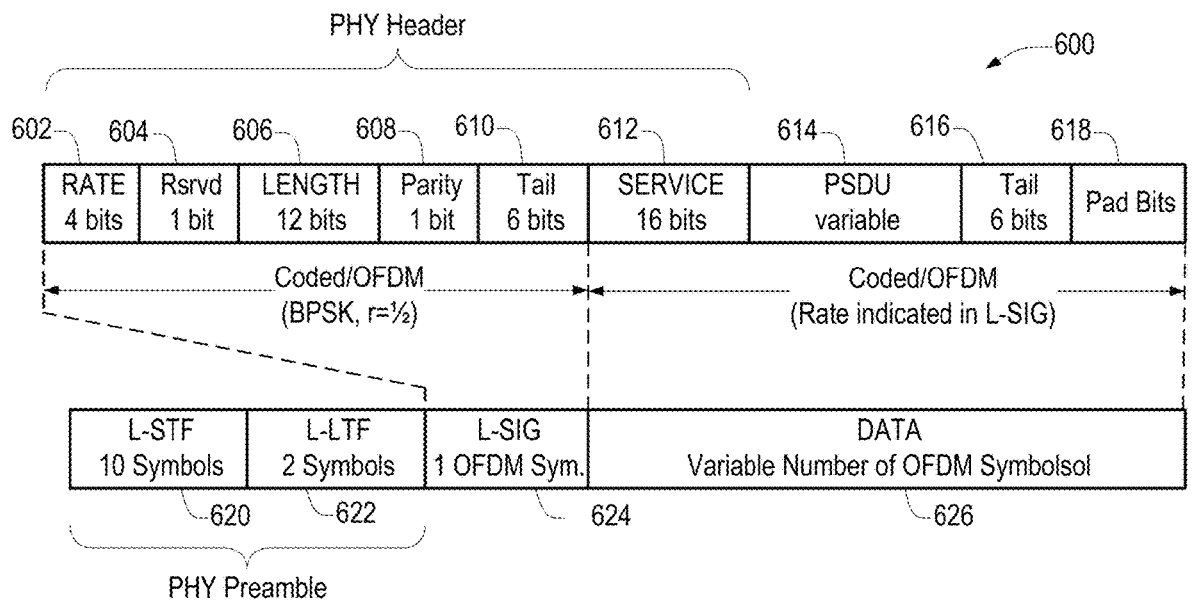
FIG. 6A illustrates a Physical layer Protocol Data Units (PPDU) of a wireless networking standard.
FIG. 6B shows a Table 1 disclosing properties of fields of the PPDU of FIG. 6A.

FIG. 6A illustrates an PPDU 600 according to an embodiment. A transmitting station generates the PPDU 600 and transmits it to one or more receiving stations. The receiving stations receive, detect, and process the PPDU 600.

The PPDU 600 includes the OFDM PHY preamble, a Legacy Signal (L-SIG) field 624 communicated using one OFDM symbol, and a Data field 626 communicated using a variable number of OFDM symbols. The Data field 626 includes a SERVICE field 612 having 16 bits, a Physical layer Service Data Unit (PSDU) 614 having a variable number of bits, a second Tail field 616 having 6 bits, and a variable number of pad bits 618. FIG. 6B includes a Table 1 providing additional details of fields of the PPDU 600.

The PHY Preamble of the PPDU 600 includes a Legacy Short Training Field (L-STF) 620 having 10 symbols and a Legacy Long Training Field (L-LTF) 622 having 2 symbols.

The PHY header includes the L-SIG field 624 and the SERVICE field 612, and contains the following fields: a Rate field 602, a reserved bit 604, a Length field 606, a parity bit 608, a first Tail field 610 having 6 bits, and the SERVICE field 612. The Rate field 602, reserved bit 604, Length field 606, parity bit 608, and first Tail field 610 constitute a single OFDM symbol having 48 data carriers, the L-SIG field 624, which is transmitted with a robust combination of BPSK modulation and a coding rate of R=½, allowing the L-SIG field 624 to carry 24 bits of information.

The SERVICE field 612 of the PHY header, the PSDU 614, the second Tail bits 616, and the pad bits 618 that comprise the Data field 626 are transmitted at the data rate described in the RATE field 602 and together may constitute multiple OFDM symbols.

The first tail bits 610 in the L-SIG 624 enable decoding of the RATE field 602 and the LENGTH field 606 immediately after the reception of the first tail bits 610. The RATE field 602 and the LENGTH field 606 must be decoded before the decoding of the DATA field 626 can be performed.

In an embodiment, the L-SIG field 624 includes an indication of whether the PPDU is a WAVE2 PPDU, wherein "WAVE2" in this document refers to a standard that is an evolution of the IEEE 802.11p standard and/or the WAVE standard. In the PPDU 600, the indication, if present, indicates that the PPDU is not a WAVE2 PPDU. In the embodiments of FIGS. 8-15 and FIGS. 18-21, the indication, if present, indicates that the PPDUs therein are WAVE2 PPDUs.

FIG. 7 includes a Table 2 comparing properties of a wireless network having a 20 MHz channel bandwidth (in particular, a wireless network according to IEEE 802.11a) and a wireless network having a 10 MHz channel bandwidth (in particular, a wireless network according to IEEE 802.11p).

The solutions provided herein have been described with reference to a wireless LAN system; however, it should be understood that these solutions are also applicable to other network environments, such as cellular telecommunication networks, wired networks, etc.

An embodiment of the invention may be an article of manufacture in which a non-transitory machine-readable medium (such as microelectronic memory) has stored thereon instructions which program one or more data processing components (generically referred to here as a "processor" or "processing unit") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment of the invention may be an apparatus (e.g., an AP STA, a non-AP STA, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

Considering demanding use cases in tough and different environments, the existing IEEE 802.11p standard may not be sufficient to support future V2X and DSRC applications. In order to support high throughput and reliable performance for future uses, new features may be included in a PPDU format derived from the IEEE 802.11p PPDU format.

In a standard that is an evolution of the IEEE 802.11p standard and/or WAVE (the evolved standard being herein referred to as the WAVE2 standard), Doppler related information in used to support use cases in high Doppler circumstances, that is, when the relative motions of two communicating devices produce variations of the wireless channel within the duration of the PPDU, and the variations might prevent successful completion of the communication if not taken into account. Doppler information in a WAVE2 format PPDU may have a first value (e.g., 1), when one or more midamble fields are inserted after M data symbols, of the PPDU, M being a predetermined midamble periodicity, and a second value (e.g., 0) when midambles are not inserted.

FIG. 8 illustrates a WAVE2 PPDU 800 according to an embodiment. The PPDU 800 includes a PHY Preamble including an L-LTF 820 and an L-LTF 822, an L-SIG field 824, a WAVE2 Signal (SIG) field 828, and a data field 826. The data field 826 includes one or more OFDM data symbols. Unless otherwise indicated, elements of FIG. 8 having reference characters of the form 8*xx* correspond to elements of FIG. 6A having reference characters of the form 6*xx*, and descriptions thereof are therefore omitted in the interest of brevity.

In an embodiment, the WAVE2 SIG field 828 includes a plurality of WAVE2 SIGx fields; e.g., a WAVE2 SIG1 field, a WAVE2 SIG2 field, and so on. In an embodiment, the WAVE2 SIG field 828 includes a plurality of OFDM symbols.

In embodiments, the WAVE2 SIG field 828 includes coding information to indicate whether to use an advanced coding (an indication of whether to use LDPC or BCC).

In embodiments, the WAVE2 SIG field 828 includes an extra OFDM symbol information to indicate that a corresponding process in a transmitter results in an extra OFDM symbol(s). This may be the result of the transmitter using an advanced coding scheme.

In embodiments, the WAVE2 SIG field 828 includes an information (e.g. Doppler field) corresponding to high Doppler environment wherein the information could be 1) a first information to indicate whether a transmitter enables a first scheme (e.g. the first scheme could be a midamble method such as described below) and/or 2) a second information to indicate how many data symbols are assigned between inserted midamble fields to provide more accurate estimated channel information. If present, two information could be jointly encoded in one field of the WAVE2 SIG field 828.

In embodiments, given rapidly changing channels around a V2X application as a default, only the second information could be contained in the WAVE2 SIG field 828.

In embodiments having a plurality of different WAVE2 PPDU formats, a third information (e.g., the signature values) could be included in the WAVE2 PPDU to identify which of the WAVE2 PPDU formats the WAVE2 PPDU was using.

In an embodiment, one of the signature values could be used to indicate a new PPDU format for use in high Doppler circumstances. For example, if the WAVE2 standard enables midamble design, then in PPDUs of the new format, midamble field(s) are inserted every indicated (or predefined) data symbols according to the number of data symbols in the new WAVE2 PPDU, as shown in FIG. 10 and described below. In another example, several signature values could be used to indicate how many data symbols are required before each midamble field is added. For example, given that the Doppler information in a WAVE2 PPDU indicates a first value (e.g. set to 1), a new WAVE2 PPDU format may be transmitted wherein the midamble fields are made up of LTF(s) inserted every M data symbols.

In an illustrative embodiment, the WAVE2 SIG field 828 may include one or more of a Signature field 802, a Doppler field 804, including Doppler information corresponding to a high Doppler environment, a midamble periodicity field 806 indicating a number of data symbols before midambles, a Coding field 808 indicating a coding scheme of the OFDM data symbols in the data field 826, and the like.

In embodiments, the WAVE2 SIG field 828 indicates whether pilot subcarrier in data symbols exist or not. In some cases (e.g. midamble enable), since those subcarriers could be meaningless to perform pilot tracking, replacing the pilot subcarriers with data subcarriers could increase the amount of data carried in each symbol, creating room for additional data or decreasing the number of WAVE2 SIG field 828 needed for a given amount of information. For example, an increase of 2 bits of data per symbol could be enough to keep the WAVE2 SIG field 828 in one OFDM symbol instead of two.

In embodiments, the data symbols in the WAVE2 PPDU consists of data subcarriers, DC subcarrier and guard subcarriers. In some cases (e.g. when midambles are enabled), since pilot subcarriers could be meaningless to perform pilot tracking, replacing the pilot subcarriers with data subcarriers could increase room for additional data or potentially decrease the number of WAVE2 data symbols used to carry data.

FIG. 9 illustrates a WAVE2 PPDU 900, according to an embodiment. The PPDU 900 includes a PHY Preamble including an L-LTF 920 and an L-LTF 922, an L-SIG field 924, a WAVE2 Signal 1 (SIG1) field 928-1, a WAVE2 Signal 2 (SIG2) field 928-2, a WAVE2 STF field 930, first to $N^{th}$ WAVE2 LTF fields 932-1 to 932-N, and a data field 926. The data field 926 includes one or more OFDM data symbols. Unless otherwise indicated, elements of FIG. 9 having reference characters of the form 9xx or 9xx-x correspond to elements of FIG. 8 having reference characters of the form 8xx or 8xx-x, and descriptions thereof are therefore omitted in the interest of brevity. In an embodiment, the information communicated using the Doppler and M fields could be jointly encoded in one of the WAVE2 SIG1 field 928-1 or the WAVE2 SIG2 field 928-2.

FIG. 10 illustrates a WAVE2 PPDU 1000, according to an embodiment. The PPDU 1000 includes a preamble 1002, a first data field 1004-1, a first midamble 1006-1, a second data field 1004-2, a second midamble 1006-2, and a third data field 1004-3. Although the PPDU 1000 is shown as having two midambles 1006, embodiments are not limited thereto, and the PPDU 1000 may have any integer number greater than or equal to 0 of midambles.

The preamble 1002 may include an L-STF, an L-LTF, an L-SIG field, and one or more WAVE2 Signal fields, such as described with respect to FIGS. 8 and 9. In embodiments, the preamble 1002 may also include one or more WAVE2 LTF fields.

In an embodiment, the transmitter inserts a midamble field after every M data symbols when operating in a high Doppler environment, where M is a predetermined midamble periodicity, and for a number of data symbols $N_{SYM}$, the transmitter inserts a number of midamble fields $N_{MA}$ according to Equation 3.

$$N_{MA}=\lfloor(N_{SYM}-1)/M\rfloor \quad\quad \text{Eq. 3}$$

In the embodiment of FIG. 10, a WAVE2 PPDU 1000 starts with a legacy preamble identical to that of an IEEE 802.11p PPDU with L-STF and L-LTF, followed by an 802.11p L-SIG field. The WAVE2 PPDU 1000 then includes a WAVE2 SIG field and a DATA field, with an OFDM numerology according to the 802.11a 20 MHz numerology, downclocked by 2 with 156.25 kHz subcarrier spacing. Downclocking results in the rate of OFDM symbol transmissions is reduced, lengthening the OFDM symbol duration, which reduces the spacing between carriers and therefore reduced the bandwidth used to transmit the OFDM symbol. The duration and $N_{SD}$ (number of data subcarriers) of each WAVE2 OFDM symbol is therefore the same 8 µs and 48 data subcarriers, respectively, of an IEEE 802.11p OFDM symbol. Thus, an extension of IEEE 802.11p may be used for the design of the WAVE2 PPDU 1000.

FIG. 11 shows operating classes according to United States of America Operating Class and international Global Operating Class. As shown in FIG. 11, the United States and the European Union have assigned dedicated channels to be used for Intelligent Transportation System (ITS) non-mobile operation and ITS mobile operations (Operating Classes 16, 17 and 18).

As a result, both IEEE 802.11p packets and WAVE2 packets may be present in the same channels. Designing the WAVE2 PPDU to permit auto-detection to differentiate the two kinds of packets as early as possible can reduce the number of different hypotheses a receiver must maintain and the amount of power consumed to determine which type of packet is being received. When a WAVE2 PPDU field is designed to support auto-detection, a design constraint is that the WAVE2 PPDU shall not have an impact on any previous-standard packet detection (e.g. IEEE 802.11p packet detection).

In embodiments, a WAVE2 PPDU contains a first information to indicate whether it is the WAVE2 PPDU or not. In embodiments, the first information is included in a WAVE2 SIG field and a receiver may determine whether a PPDU is a WAVE2 PPDU upon decoding the WAVE2 SIG field.

In an embodiment, the first information indicating whether a PPDU is a WAVE2 PPDU is included in a signature field of a WAVE2 SIG field of a PPDU, such as the signature field 802 of the WAVE2 SIG field 828 of PPDU 800 of FIG. 8. The WAVE2 SIG field 828 comprises OFDM symbols based on half clocked mode with a 10 MHz bandwidth.

FIG. 12 illustrates a process 1200 for determining whether a PPDU is a WAVE2 PPDU, according to an embodiment. The process 1200 may be performed by a receiving device, such as the station 104 or the RSI 102 of FIG. 1.

At S1202, the process 1200 receives and decodes an $N^{th}$ OFDM symbol of a PPDU, where N is a predetermined number. In an embodiment, N corresponds to the location of the first symbol of a WAVE2 SIG field in a WAVE2 PPDU.

In an embodiment, the $N^{th}$ OFDM symbol includes tail bits so that decoding of the $N^{th}$ OFDM symbol may be concluded without information from any subsequent OFDM symbols. In an embodiment where the $N^{th}$ OFDM symbol is a symbol in a multi-symbol WAVE2 SIG field, the tail bits may be included in the first symbol of the WAVE2 SIG field.

At S1204, the process 1200 determines a first information using the Nth OFDM symbol.

At S1206, the process 1200 determines whether the first information indicates that the PPDU is a WAVE2 PPDU. In response to the first information indicating that the PPDU is a WAVE2 PPDU, the process 1200 proceeds to S1208; otherwise, at S1206 the process 1200 proceeds to S1210.

At S1208, the process 1200 receives and decodes the PPDU in accordance with the WAVE2 standard. The process 1200 then exits.

At S1210, the process 1200 receives and decodes the PPDU in accordance with a legacy standard, such as the IEEE 802.11p standard. This may include decoding the PPDU based on control information in a L-SIG field preceding the $N^{th}$ OFDM symbol. The process 1200 then exits.

The process 1200 provides flexibility to detect different PPDU formats, but requires time to decode the WAVE2 SIG field first. Accordingly, in other embodiments described below, whether the PPDU is a WAVE2 PPDU may be detected before decoding the WAVE2 SIG field.

Figure 13:
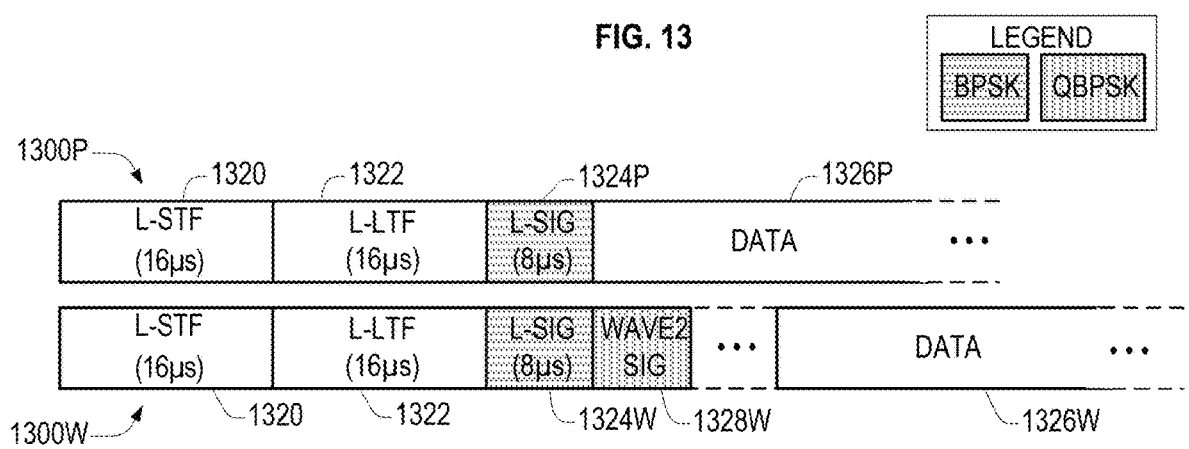
FIG. 13 illustrates a PPDU according to an existing standard and a PPDU according to an embodiment.

FIG. 13 shows a PPDU 1300P according to the IEEE 802.11p standard and a PPDU 1300W according to a WAVE2 standard. Unless otherwise indicated, elements of FIG. 13 having reference characters of the form 13xx correspond to elements of FIG. 8 having reference characters of the form 8xx, and descriptions thereof are omitted in the interest of brevity.

In the embodiment of FIG. 13, a first OFDM symbol of a WAVE2 SIG field 1328W is modulated with a first modulation, wherein the constellation of the data tones is rotated by X degrees counter-clockwise relative to the symbol of L-SIG 1324W or 1324P. For example, the first modulation could be Quadrature BPSK (QBPSK). In contrast, the L-SIG field 1324P and the L-SIG field 1324W may be modulated using BPSK. In the embodiment shown in FIG. 13, the WAVE2 SIG field 1328W is one OFDM symbol.

Accordingly, that the PPDU 1300W is a WAVE2 PPDU may be determined by determining that the first OFDM symbol of a WAVE2 SIG field 1328W is modulated using QBPSK. In the illustrated embodiment, the OFDM symbols are based on a half-clocked mode with a 10 MHz bandwidth, but embodiments are not limited thereto. However, it does not limit to half-clocked mode with 10 MHz bandwidth. Here the WAVE2 SIG field 1328W is one OFDM symbol.

In particular, in an embodiment as illustrated in FIG. 13, an 802.11p-compliant receiving device will determine that the PPDU 1300W is invalid upon performing a Frame Check Sequence (FCS) determination for the PPDU 1300W. In contrast, the WAVE2-compliant receiving device will determine that the PPDU 1300W as a WAVE2 PPDU in response to auto-detecting the QBPSK constellation of at least the first OFDM symbol located at the position of the WAVE2 SIG field 1328W, before completing the decoding of the WAVE2 SIG field 1328W.

Figure 14:
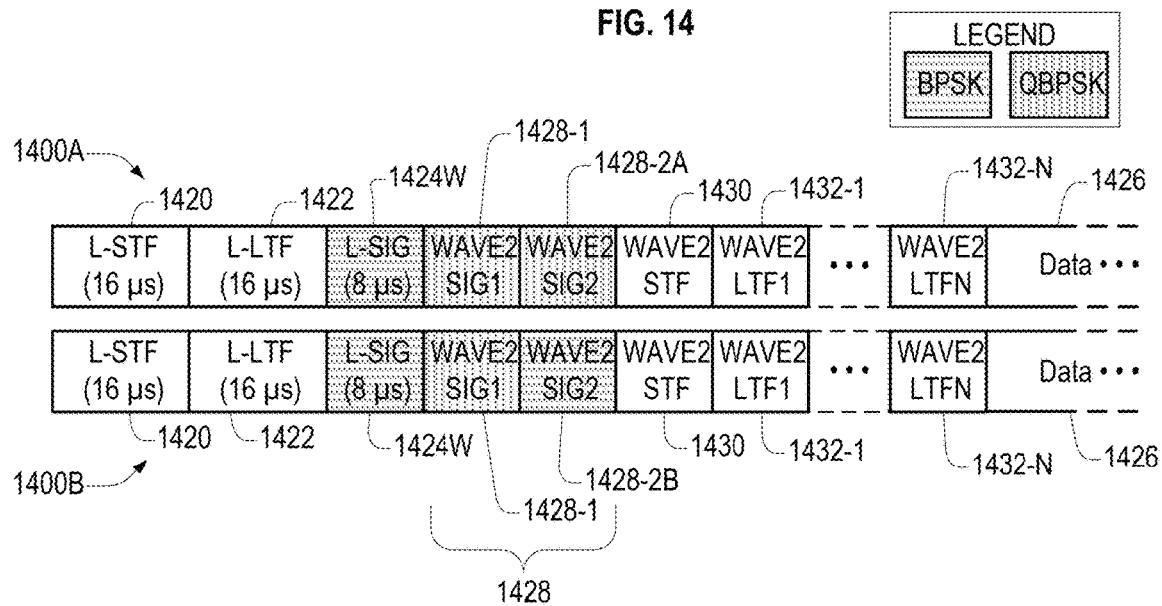
FIG. 14 illustrates two PPDUs, according to embodiments.

FIG. 14 shows a first PPDU 1400A according to a first embodiment of a WAVE2 standard and a second PPDU 1400B according to a second embodiment of a WAVE2 standard. Unless otherwise indicated, elements of FIG. 14 having reference characters of the form 14xx correspond to elements of FIG. 8 having reference characters of the form 8xx, and descriptions thereof are omitted in the interest of brevity.

The first and second PPDUs 1400A and 1400B differ from the PPDU 1300 of FIG. 13 in having two OFDM symbols in the WAVE2 SIG field 1428. The first PPDU 1400A differs from second PPDU 1400B in that the second symbol 1428-2A of the WAVE2 SIG field 1428 of PPDU 1400A is QBPSK modulated (for example, modulated using BPSK with 90 degrees rotation), while the second symbol 1428-2B of the WAVE2 SIG field 1428 of PPDU 1400B is BPSK modulated. Determining whether a PPDU is an IEEE 802.11p PPDU or a WAVE2 PPDU is performed in the same manner as described with reference to FIG. 13.

As illustrated, FIG. 14 illustrates PPDUs transmitted using OFDM symbols based on half clocked mode with 10 MHz bandwidth, but embodiments are not limited thereto.

The embodiment of FIG. 12 and of FIGS. 13 and 14 each provide benefits. The embodiment of FIG. 12 allows many options to distinguish different PPDU types for future use. The embodiments of FIGS. 13 and 14 provides auto-detection of PPDU type as early as possible, before WAVE2 SIG decoding. In embodiments, the two concepts could be combined to take both benefits as much as possible.

Figure 15:
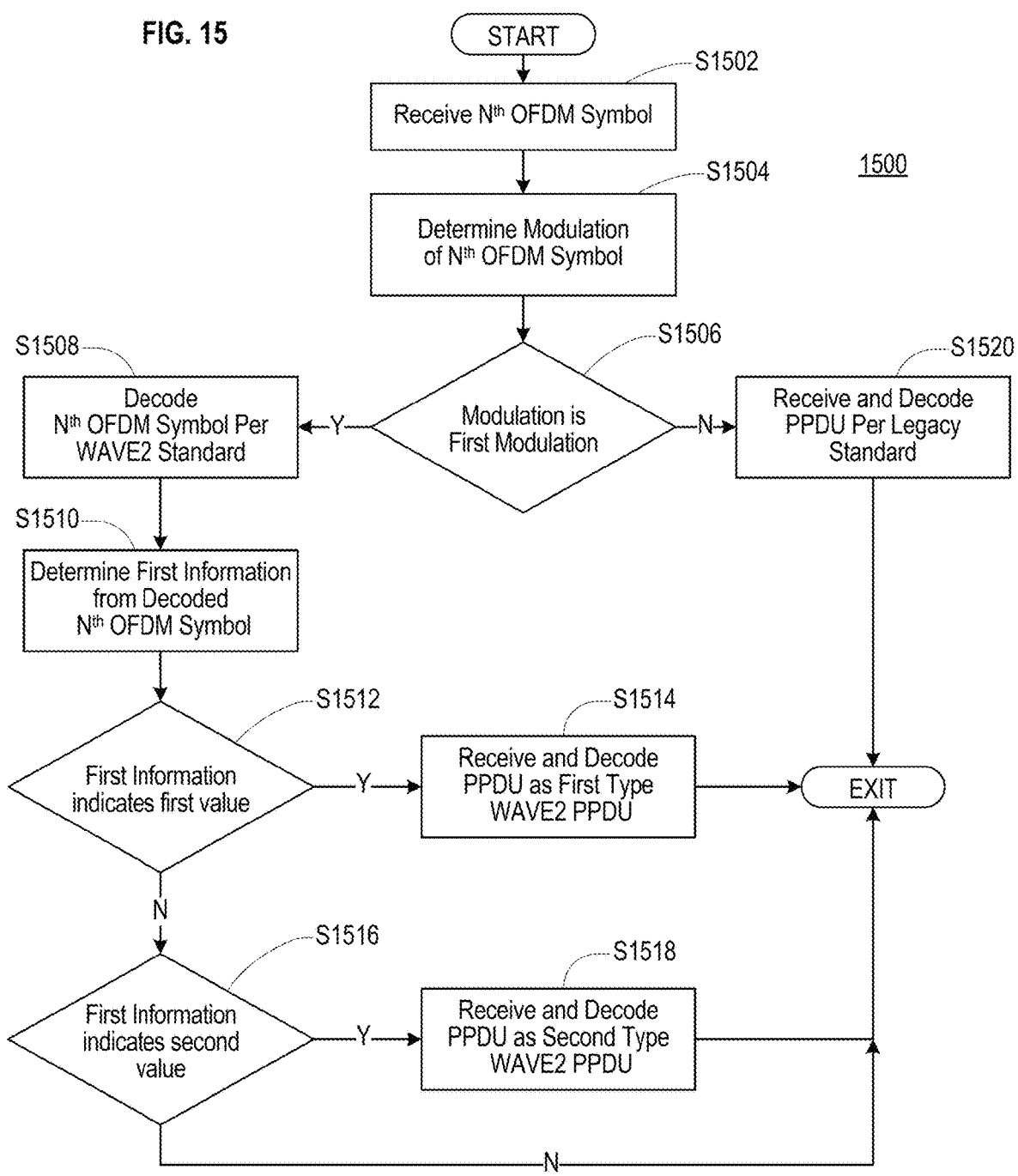
FIG. 15 illustrates a process for determining a type of a PPDU, according to another embodiment.

FIG. 15 illustrates a process 1500 for determining whether a PPDU is a 11p PPDU or a type of a WAVE2 PPDU, according to an embodiment. The process may be performed by a receiving device, such as the station 104 or the RSI 102 of FIG. 1.

At S1502, the process 1500 receives an $N^{th}$ OFDM symbol of a PPDU, where N is a predetermined number. In an embodiment, N corresponds to the location of the first symbol of a WAVE2 SIG field in a WAVE2 PPDU.

At S1504, the process 1500 determines a modulation of the Nth OFDM Symbol. In an embodiment, the process 1500 determines whether the Nth OFDM symbol is modulated using a first modulation, such as QBPSK, or a modulation other than QBPSK.

At S1506, in response to the modulation of the Nth OFDM symbol being the first modulation (e.g., QBPSK), the process 1500 proceeds to S1508; otherwise, at S1506 the process 1500 proceeds to S1520.

At S1508, the process 1500 decodes the $N^{th}$ OFDM symbol in accordance with the WAVE2 standard. In an embodiment, the $N^{th}$ OFDM symbol includes tail bits so that decoding of the $N^{th}$ OFDM symbol may be concluded without information from any subsequent OFDM symbols. In an embodiment where the $N^{th}$ OFDM symbol is a symbol in a multi-symbol WAVE2 SIG field, the tail bits may be included in the first symbol of the WAVE2 SIG field.

At S1510, the process 1500 determines first information using the decoded $N^{th}$ OFDM symbol. In an embodiment, the first information is included in a WAVE2 SIG field. In an embodiment, the first information is included in a signature field of the WAVE2 SIG field.

At S1512, in response to the first information indicating a first value, the process 1500 proceeds to S1514; otherwise, at S1512 the process 1500 proceeds to S1516.

At S1514, the process 1500 decodes the PPDU as a first type of WAVE PPDU. The process 1500 then exits.

At S1516, in response to the first information indicating a second value, the process 1500 proceeds to S1518; otherwise, at S1516 the process 1500 exits.

At S1518, the process 1500 decodes the PPDU as a second type of WAVE PPDU. The process 1500 then exits.

At S1520, the process 1500 receives and decodes the PPDU in accordance with a legacy standard, such as the IEEE 802.11p standard. This may include decoding the PPDU based on control information in a L-SIG field preceding the $N^{th}$ OFDM symbol. The process 1500 then exits.

Figure 16:
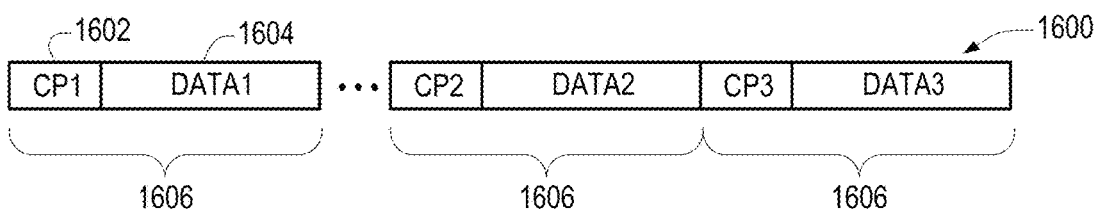
FIG. 16 illustrates a sequence of symbols, according to an embodiment.

FIG. 16 illustrates a sequence 1600 of OFDM symbols 1606, according to an embodiment. Each OFDM symbol 1606 comprise a Cyclic Prefix (CP) in a Guard Interval (GI) 1602 and a data portion 1604. In embodiments, the duration of a GI 1602 may be flexible in order to accommodate a varying environment (e.g., mobility of the device or mobility of objects around the device, etc.). For example, in a rural environment for Line-Of-Sight (LOS) communication, using a longer GI may be preferable to complicated features such as LDPC or midambles.

In an embodiment, the duration of the GI could be indicated explicitly by a first information included in the WAVE2 PPDU. In an embodiment, the first information could be included in WAVE2 SIG OFDM symbol.

In embodiments, the first information could include a plurality of bits. For example, GIs of the PPDU may have a first duration if the value of the first information sets to 0, and may have a second duration if the value of the second information sets to 1, and may have a third duration if the value of the second information sets to 2. In another embodiment, when the second information is set to 2, the durations of the GIs may alternate between a first duration and a second duration, so that a first OFDM symbol having a GI with the first duration is followed by a second OFDM symbol having a GI with the second duration, and the second OFDM symbol is followed by a third OFDM symbol having a GI with the first duration, and so on. The first and second durations of the GI and whether the durations alternate as described above are determined according to a predetermined rule known to both transmitter and receiver.

In an embodiment, the first duration is 1.6 μs. In an embodiment, the second duration could be longer than 16 μs (such as, for example, 3.2 μs).

In an embodiment, regardless of any specific WAVE2 PPDU format, the flexible GI could be applied to a data portion of any of the WAVE2 PPDU embodiments disclosed herein, including the WAVE2 PPDU 800 of FIG. 8.

The WAVE2 PPDU 800 starts with a legacy preamble of the IEEE 802.11p standard with L-STF, L-LTF and L-SIG fields. After that, the WAVE2 PPDU 800 includes a WAVE2 SIG field 828 and a DATA field 826, wherein an OFDM numerology follows the 802.11a 20 MHz numerology downclocked by 2, with 156.25 kHz subcarrier spacing for each field in the WAVE2 PPDU 800.

Duration and $N_{SD}$ (number of data subcarriers) of each WAVE2 OFDM symbol is the same (8 μs duration and 48 data subcarriers) as in each 802.11p OFDM symbol. The WAVE2 PPDU 800 is an extension of the 802.11p standard.

Figures 17A, 17B, 17C:
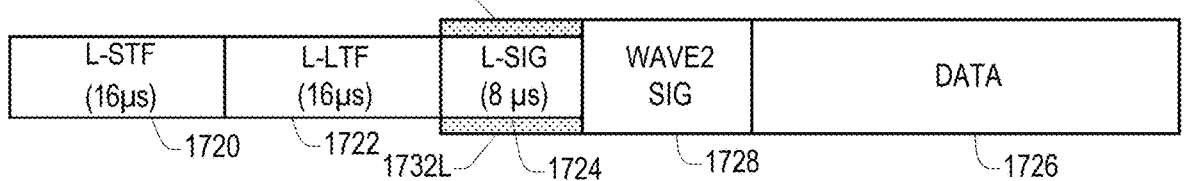
FIG. 17A illustrates a PPDU including extra tones, according to an embodiment.
FIG. 17B shows a Table 3 showing maximum 99.9% Peak to Average Power Ratios (PAPRs) for sequences in the extra tones of FIGS. 14 and 15.
FIG. 17C shows a Table 4 showing maximum 99.0% Peak to Average Power Ratios (PAPRs) for sequences in the extra tones of FIGS. 14 and 15.

FIG. 17A illustrates a WAVE2 PPDU 1700 according to another embodiment. Unless otherwise indicated, elements of FIG. 17A having reference characters of the form 17xx correspond to elements of FIG. 8 having reference characters of the form 8xx, and descriptions thereof are therefore omitted in the interest of brevity. Additionally, the WAVE2 PPDU 1700 includes extra upper L-SIG tones 1732H and lower L-SIG tones 1732L.

In order to provide better OFDM efficiency, an OFDM tone plan could be designed based on a different IEEE 802.11 standard than the IEEE 802.11a standard. For example, the IEEE 802.11ac 20 MHz numerology could be downclocked by 2, resulting in a WAVE2 numerology wherein the number of data subcarrier is 52 tones compared to 48 tones of IEEE 802.11a downclocked by 2 (i.e., the 48 tones of IEEE 802.11p.). In another embodiment, the IEEE 802.11ac 40 MHz numerology could be downclocked by 4, resulting in a WAVE2 numerology, wherein a number of data subcarriers is equal to 108 tones. In another embodiment, the IEEE 802.11ac 80 MHz numerology could be downclocked by 8, resulting in a WAVE2 numerology wherein a number of data subcarriers equal to 234 tones.

In order to measure channel characteristics for those extra tones, extra tones should be added somewhere before WAVE2 SIG OFDM symbol(s). In FIG. 17A, this is provided in the form of the extra upper L-SIG tones 1732H and the extra lower L-SIG tones 1732L.

The WAVE2 PPDU 1700 starts with a legacy preamble like that of an IEEE 802.11p PPDU with a L-STF 1720, a L-LTF 1722, and an L-SIG field 1724. Followed that is a WAVE2 SIG field 1728 and a DATA field 1726. A legacy OFDM numerology (i.e., an IEEE 802.11p numerology) is applied to the legacy preamble and a WAVE2 OFDM numerology different from the legacy numerology is applied to WAVE2 SIG field 1728 and a DATA field 1726. With extra tone added before the WAVE2 numerology, the WAVE2 portion of the PPDU is allowed to carry extra data information per unit of time.

Assuming the extra tones are either {+1 or −1}, BPSK constellation value experiments have been performed to measure peak power to average power ratio (PAPR) of an L-SIG OFDM symbol with the extra upper L-SIG tones 1732H and lower L-SIG tones 1732L. The measurement was performed for all valid L-SIG content values for an IEEE 802.11p L-SIG field.

FIGS. 17B and 17C include Tables 3 and 4 showing potential sequences for use in the upper and lower L-SIG extra tones 1432H and 1432L, and the expected maximum PAPR for that field in 99.9% (Table 3) and 99% (Table 4) of the possible values for the L-SIG field 1424. Tables 3 and 4 were determined by assuming the extra tones are either {+1 or −1} BPSK constellation values and measuring the PAPR of an L-SIG OFDM symbol with the extra tones. The measurement was performed for all valid L-SIG content values for an IEEE 802.11p PPDU. A set of sequences were thereby identified for the extra tones (e.g., sequence 7, followed closely by sequences 8 and 15) that had minimal PAPR over all possible valid L-SIG contents. Respective embodiments may use sequences 7, 8, or 15 for the upper and lower L-SIG extra tones 1432H and 1432L in order to reduce the PAPR of the L-SIG filed 1424.

Figure 18:
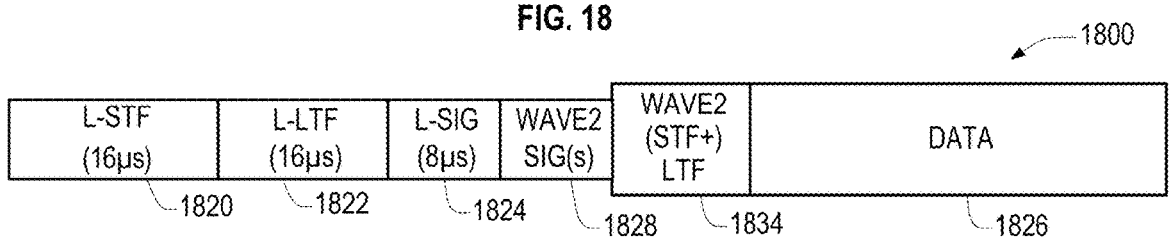
FIG. 18 illustrates a PPDU using additional tones in symbols of a data field, according to an embodiment.

FIG. 18 illustrates a WAVE2 PPDU 1800 according to another embodiment. Unless otherwise indicated, elements of FIG. 18 having reference characters of the form 18xx correspond to elements of FIG. 17 having reference characters of the form 17xx, and descriptions thereof are therefore omitted in the interest of brevity. The WAVE2 PPDU 1800 includes a WAVE Training Field 1834.

In an embodiment, the WAVE2 Training Field 1834 includes one or more WAVE2 Long Training Fields (LTFs). In another embodiment, the WAVE2 Training Field 1834 includes a WAVE2 Short Training Filed (STF) and one or more WAVE2 Long Training Fields (LTFs). The WAVE2 STF and the WAVE2 LTF use a WAVE2 OFDM numerology identical to the WAVE2 numerology used in the data field 1826.

Because the WAVE2 STF and/or WAVE2 LTF in the WAVE2 Training Field 1834 cover all channel measurements for additional tones for the WAVE2 data field 1826, extra tones beside L-SIG are no longer needed. While the WAVE2 data field 1826 is enabled by the additional data tomes in its numerology to carry extra data information, the WAVE2 SIG field keeps the same 48 data subcarriers. If control information for WAVE2 PPDU fits within 24/48 bits, this embodiment works without additional need to handle extra tones in the WAVE2 SIG field.

Figure 19:
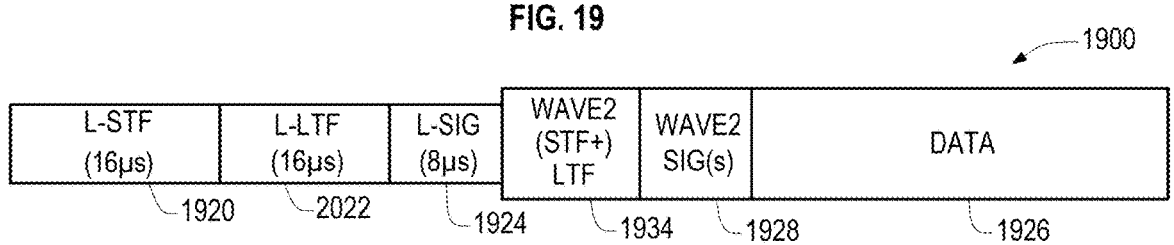
FIG. 19 illustrates a PPDU using additional tones in symbols of a data field, according to another embodiment.

FIG. 19 illustrates a WAVE2 PPDU 1900 according to another embodiment. Unless otherwise indicated, elements of FIG. 19 having reference characters of the form 19xx correspond to elements of FIG. 18 having reference characters of the form 18xx, and descriptions thereof are therefore omitted in the interest of brevity.

The WAVE2 PPDU 1900 differs from the WAVE2 PPDU 1800 by having the WAVE2 Training Field 1934 occur before the WAVE2 SIG field 1928. As a result, the WAVE2 SIG field 1928 may use the WAVE2 OFDM numerology and therefore carry additional information, without needing extra data tones accompanying the L-SIG field 1924.

Figure 20:
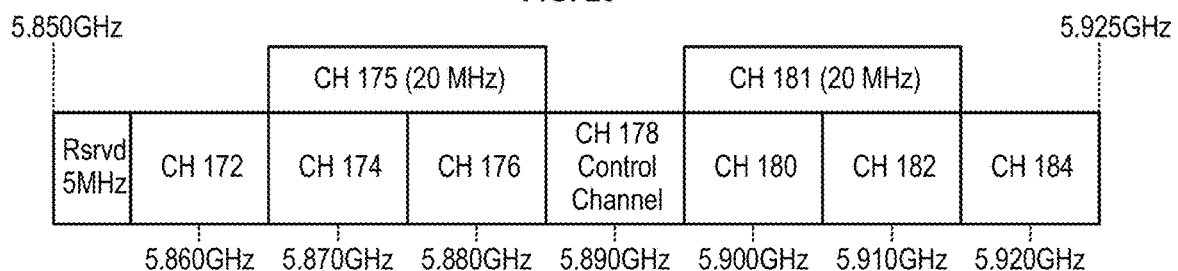
FIG. 20 illustrates channels for wireless communications.

Under some channel conditions, WAVE2 PPDUs might need to be more robust than IEEE 802.11p just to send the same data. FIG. 20 shows the channels available for ITS communications such as IEEE 802.11p communications and WAVE 2 communications. As shown in FIG. 20, two 20 MHz channels are available in the 5.9 GHz band (CHs 175 and 181). Accordingly, a WAVE2 PPDU device could be allowed to those channels for 20 MHz WAVE2 PPDU communications. Embodiments presented herein provide methods transmit data by repeating or interleaving the data together over a broad bandwidth to gain the advantages of frequency diversity gain.

Figure 21:
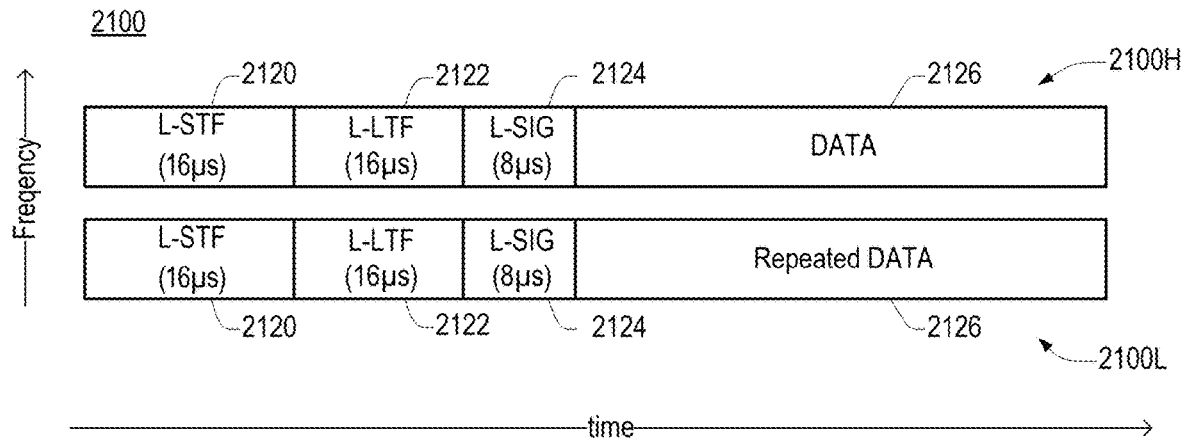
FIG. 21 illustrates a PPDU in a 20 MHz channel, according to an embodiment.

FIG. 21 illustrates a WAVE2 PPDU 2100 for communications in a 20 MHz channel, according to an embodiment. The WAVE2 PPDU 2100 consists of upper and lower IEEE 802.11p PPDUs 2100H and 2100L, each in a separate 10 MHz channel. Unless otherwise indicated, elements of FIG. 21 having reference characters of the form 21xx correspond to elements of FIG. 6 having reference characters of the form 6xx, and descriptions thereof are therefore omitted in the interest of brevity.

In the WAVE2 PPDU 2100, the data in the Data field 2126 of lower PPDU 2100L is a copy of the data in the Data field 2126 of upper PPDU 2100H.

To indicate that the WAVE2 PPDU 2100 is a 20 MHz WAVE2 PPDU instead of 10 MHz IEEE 802.11p PPDU, a value of (LENGTH mod 3), where LENGTH is the value of the LENGTH field of the L-SIG field 2124, could be used. For example, if a value of LENGTH mod 3 is set to 0, then the PPDU including the L-SIG field is a 10 MHz IEEE 802.11p PPDU; otherwise, it is 20 MHz WAVE2 PPDU.

Figure 22:
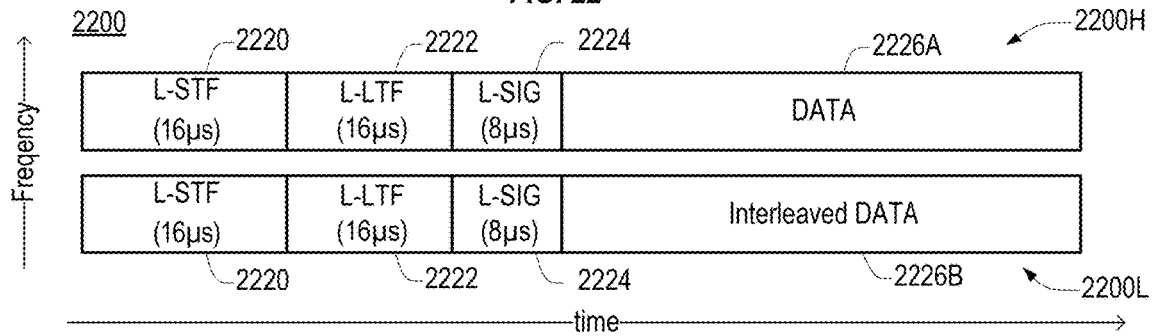
FIG. 22 illustrates a PPDU in a 20 MHz channel, according to another embodiment.

FIG. 22 illustrates a WAVE2 PPDU 2200 for communications in a 20 MHz channel, according to an embodiment. The WAVE2 PPDU 2200 consists of upper and lower IEEE 802.11p PPDUs 2200H and 2200L, each in a separate 10 MHz channel. Unless otherwise indicated, elements of FIG. 22 having reference characters of the form 22xx correspond to elements of FIG. 21 having reference characters of the form 21xx, and descriptions thereof are therefore omitted in the interest of brevity.

In the WAVE2 PPDU 2200, the data in the Data field 2226B of lower PPDU 2200L is an interleaved version of the data in the Data field 2226A of upper PPDU 2200H. In interleaving, the data is reordered according to a predetermined sequence to reduce the effect of burst errors.

Figure 23:
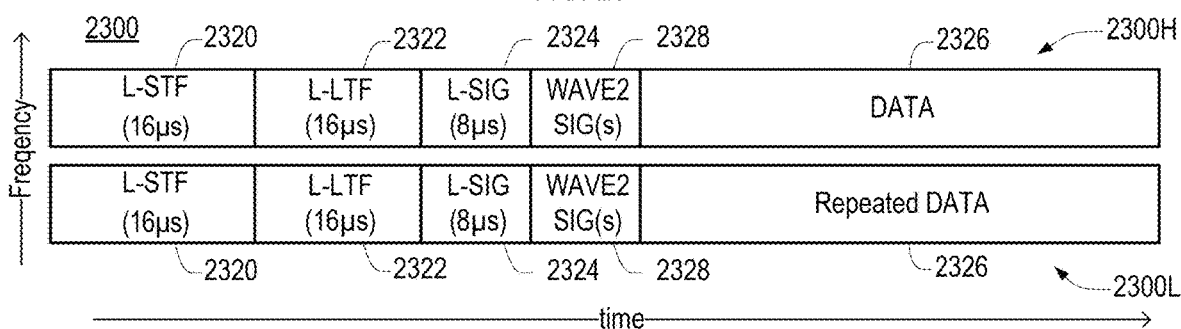
FIG. 23 illustrates a PPDU in a 20 MHz channel, according to another embodiment.

FIG. 23 illustrates a WAVE2 PPDU 2300 for communications in a 20 MHz channel, according to an embodiment. The WAVE2 PPDU 2200 consists of upper and lower 10 MHz WAVE2 PPDUs 2300H and 2300L, each in a separate 10 MHz channel. Unless otherwise indicated, elements of FIG. 23 having reference characters of the form 23xx correspond to elements of FIG. 8 having reference characters of the form 8xx, and descriptions thereof are therefore omitted in the interest of brevity.

In the WAVE2 PPDU 2300, the data in the Data field 2326 of lower 10 MHz WAVE2 PPDU 2300L is a copy of data in the Data field 2326 of upper 10 MHz WAVE2 PPDU 2300H.

To indicate whether the WAVE2 PPDU 2300 is a 20 MHz WAVE2 PPDU or a 10 MHz WAVE2 PPDU, a first information could be included in WAVE2 SIG field. In an embodiment, the first information is a bandwidth field. For example, if a value of the first information is set to 0, then it is 10 MHz WAVE2 PPDU. Otherwise, it is 20 MHz WAVE2 PPDU.

Figure 24:
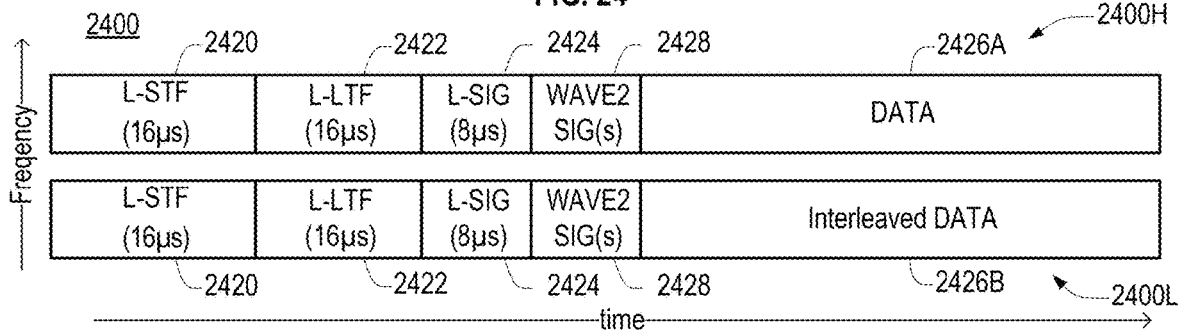
FIG. 24 illustrates a PPDU in a 20 MHz channel, according to another embodiment.

FIG. 24 illustrates a WAVE2 PPDU 2400 for communications in a 20 MHz channel, according to an embodiment. The WAVE2 PPDU 2400 consists of upper and lower 10 MHz WAVE2 PPDUs 2400H and 2400L, each in a separate 10 MHz channel. Unless otherwise indicated, elements of FIG. 24 having reference characters of the form 24xx correspond to elements of FIG. 23 having reference characters of the form 8xx, and descriptions thereof are therefore omitted in the interest of brevity.

In the WAVE2 PPDU 2300, the data in the Data field 2426B of lower 10 MHz WAVE2 PPDU 2400L is an interleaved version of the data in the Data field 2426A of upper 10 MHz WAVE2 PPDU 2400H.

To indicate whether the WAVE2 PPDU 2400 is a 20 MHz WAVE2 PPDU or a 10 MHz WAVE2 PPDU, a first information could be included in WAVE2 SIG field. In an embodiment, the first information is a bandwidth field. For example, if a value of the first information is set to 0, then it is 10 MHz WAVE2 PPDU. Otherwise, it is 20 MHz WAVE2 PPDU.

Figure 25:
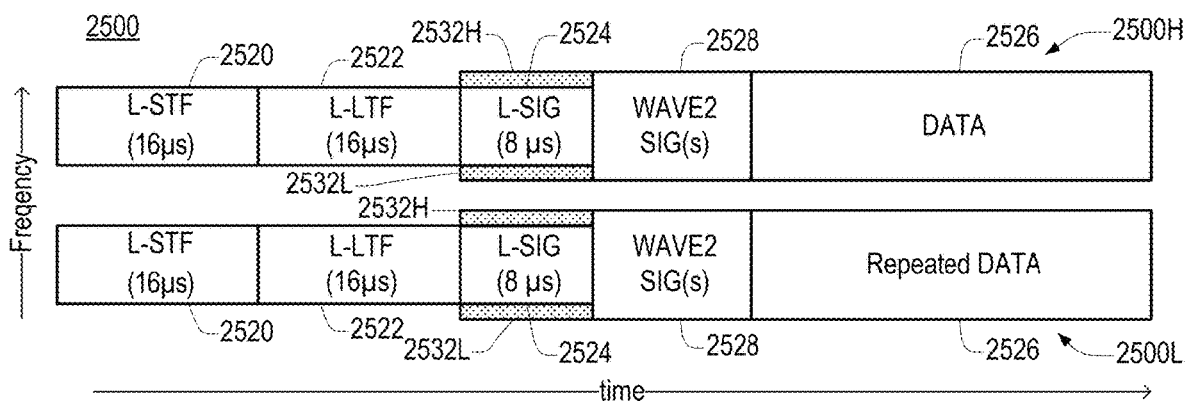
FIG. 25 illustrates a PPDU in a 20 MHz channel, according to another embodiment.

FIG. 25 illustrates a WAVE2 PPDU 2500 for communications in a 20 MHz channel, according to an embodiment. The WAVE2 PPDU 2500 consists of upper and lower 10 MHz WAVE2 PPDUs 2500H and 2500L, each in a separate 10 MHz channel. Unless otherwise indicated, elements of FIG. 25 having reference characters of the form 25xx correspond to elements of FIG. 17A having reference characters of the form 17xx, and descriptions thereof are therefore omitted in the interest of brevity. As described with respect to FIG. 17A, each of the upper and lower 10 MHz WAVE2 PPDUs 2500H and 2500L have a legacy portion using an IEEE 802.11p OFDM numerology, and a WAVE2 portion having a WAVE OFDM numerology different than the IEEE 802.11p OFDM numerology.

In the WAVE2 PPDU 2500, the data in the Data field 2526 of lower 10 MHz WAVE2 PPDU 2500L is a copy of data in the Data field 2526 of upper 10 MHz WAVE2 PPDU 2500H.

To indicate whether the WAVE2 PPDU 2500 is a 20 MHz WAVE2 PPDU or a 10 MHz WAVE2 PPDU, a first information could be included in WAVE2 SIG field. In an embodiment, the first information is a bandwidth field. For example, if a value of the first information is set to 0, then it is 10 MHz WAVE2 PPDU. Otherwise, it is 20 MHz WAVE2 PPDU.

Figure 26:
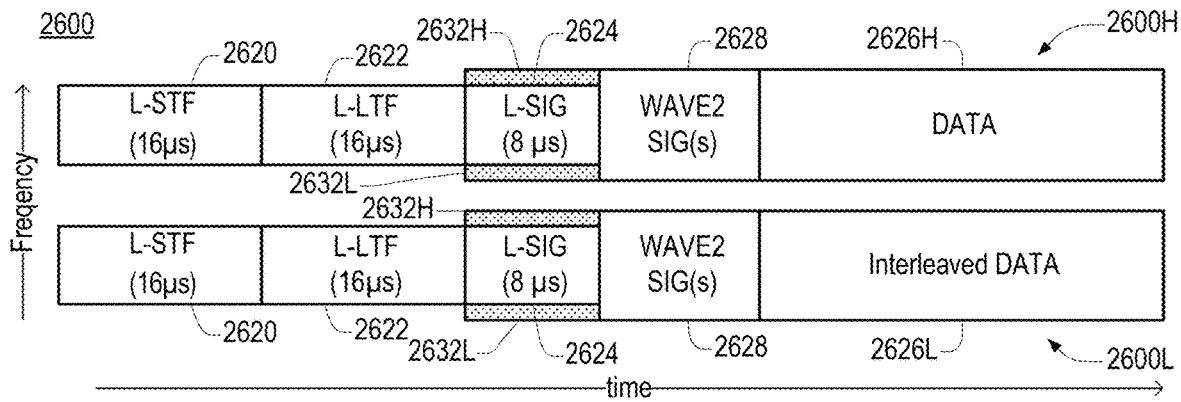
FIG. 26 illustrates a PPDU in a 20 MHz channel, according to another embodiment.

FIG. 26 illustrates a WAVE2 PPDU 2600 for communications in a 20 MHz channel, according to an embodiment. The WAVE2 PPDU 2600 consists of upper and lower 10 MHz WAVE2 PPDUs 2600H and 2600L, each in a separate 10 MHz channel. Unless otherwise indicated, elements of FIG. 26 having reference characters of the form 26xx correspond to elements of FIG. 25 having reference characters of the form 25xx, and descriptions thereof are therefore omitted in the interest of brevity.

The WAVE2 PPDU 2600 differs from the WAVE2 PPDU 2500 of FIG. 25 in that the data in the Data field 2626 of lower 10 MHz WAVE2 PPDU 2600L is an interleaved version of the data in the Data field 2626 of upper 10 MHz WAVE2 PPDU 2600H.

Figure 27:
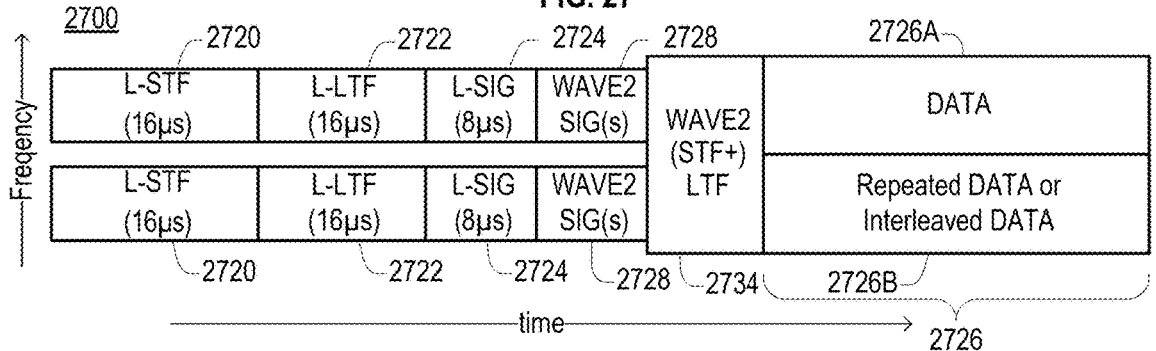
FIG. 27 illustrates a PPDU in a 20 MHz channel, according to another embodiment.

FIG. 27 illustrates a WAVE2 PPDU 2700 for communications in a 20 MHz channel, according to an embodiment. The WAVE2 PPDU 2700 includes in each 10 MHz of the 20 MHz channel an L-STF 2720, an L-LTF 2722, an L-SIG field 2724 and a WAVE2 SIG field 2728, each communicated using an IEEE 802.11p OFDM numerology. To indicate whether the WAVE2 PPDU 2700 is a 20 MHz WAVE2 PPDU or a 10 MHz WAVE2 PPDU, a first information could be included in a WAVE2 SIG field 2728. In an embodiment, the first information is a bandwidth field. For example, if a value of the first information is set to 0, then the WAVE2 PPDU 2700 is 10 MHz WAVE2 PPDU. Otherwise, it is 20 MHz WAVE2 PPDU.

The WAVE2 PPDU 2700 further includes a WAVE2 20 MHz Training field 2734 and a WAVE2 20 MHz Data field 2726 each communicated using a 20 MHz WAVE2 OFDM numerology. The 20 MHz WAVE2 OFDM may be an IEEE 802.11n 40 MHz numerology downclocked by 2, and an IEEE 802.11ac 40 MHz numerology downclocked by 2, or an IEEE 802.11ac 80 MHz numerology downclocked by 4.

In embodiment, the WAVE2 20 MHz Training field 2734 includes one or more WAVE2 20 MHz LTF. In an embodiment, the WAVE2 20 MHz Training field 2734 includes a WAVE2 20M Hz STF and one or more 20 MHz WAVE2 LTF. The WAVE2 20 MHz Training field 2734 is suitable for determining channel conditions of the entirety of the 20 MHz channel In an embodiment, an upper 10 MHz Data field portion 2726A includes data and a lower 10 MHz Data field portion 2726B includes a copy of the data. In another embodiment, an upper 10 MHz Data field portion 2726A includes data and a lower 10 MHz Data field portion 2726B includes an interleaved version of the data. The effective number of data carriers is half the number of data carriers $N_{SD}$.

Figure 28:
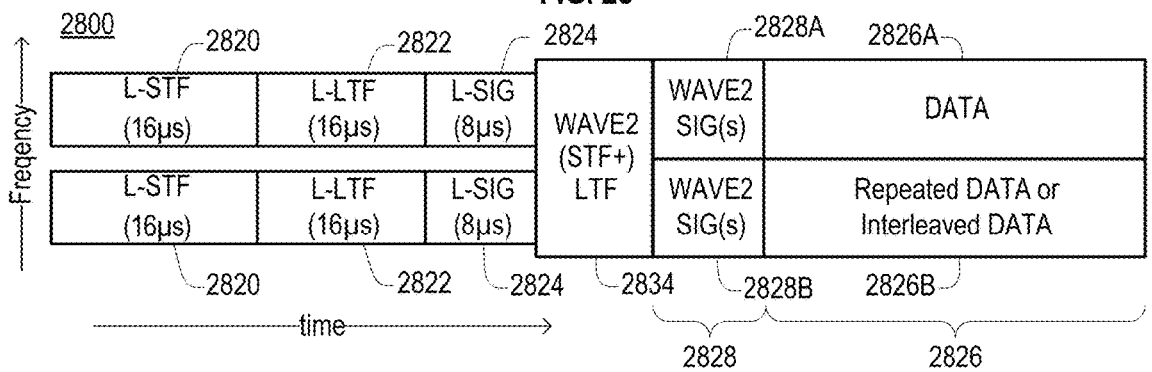
FIG. 28 illustrates a PPDU in a 20 MHz channel, according to another embodiment.

FIG. 28 illustrates a WAVE2 PPDU 2800 for communications in a 20 MHz channel, according to an embodiment. Unless otherwise indicated, elements of FIG. 28 having reference characters of the form 28xx correspond to elements of FIG. 27 having reference characters of the form 27xx, and descriptions thereof are therefore omitted in the interest of brevity.

The WAVE2 PPDU 2800 differs from the WAVE2 PPDU 2700 of FIG. 27 in that the WAVE2 SIG field 2828 comes after the WAVE2 20 MHz Training field 2634. As a result, the WAVE2 SIG field 2828 may use the WAVE2 20 MHz numerology. In the embodiment shown, the WAVE2 SIG field 2828 includes upper and lower WAVE2 SIG field 2828H and 2828L, each occupying 10 MHz of the 20 MHz channel. In an embodiment, the information in the upper and lower WAVE2 SIG field 2828H and 2828L is identical.

In an embodiment, the WAVE2 PPDU 2800 is determined to be a WAVE2 20 MHz PPDU according to the LENGTH field of the L-SIG fields 2824, as previously described.

Figure 29:
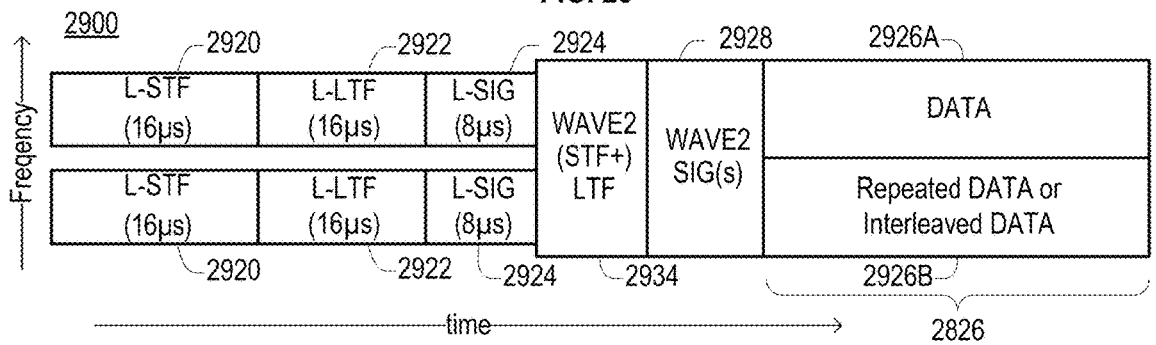
FIG. 29 illustrates a PPDU in a 20 MHz channel, according to another embodiment.

FIG. 29 illustrates a WAVE2 PPDU 2900 for communications in a 20 MHz channel, according to an embodiment. Unless otherwise indicated, elements of FIG. 29 having reference characters of the form 29xx correspond to elements of FIG. 28 having reference characters of the form 28xx, and descriptions thereof are therefore omitted in the interest of brevity.

The WAVE2 PPDU 2900 differs from the WAVE2 PPDU 2800 of FIG. 28 in that the WAVE2 SIG field 2928 is not divided into duplicated upper and lower portions. Instead, each of the data subcarriers of the WAVE2 20 MHz numerology may be used to carry unique portions of the information in the WAVE2 SIG field 2928.

To indicate whether the WAVE2 PPDU 2900 is a 20 MHz WAVE2 PPDU or 10 MHz WAVE2 PPDU, a first information could be included in WAVE2 SIG field. For example, the first information could be BW field. For example, if a value of the first information is set to 0, then it is 10 MHz WAVE2 PPDU. Otherwise, it is 20 MHz WAVE2 PPDU.

FIG. 30 include a Table 5 showing possible sources for a WAVE2 20 MHz OFDM numerology. For example, a WAVE2 20 MHz OFDM numerology could be equivalent to any of an IEEE 802.11n 40 MHz OFDM numerology downclocked by 2.

FIG. 31 illustrates a WAVE2 PPDU 3100 for communications in a 20 MHz channel, according to an embodiment. Unlike embodiments with duplicate or interleaved data, the WAVE2 PPDU 3100 uses the 20 MHz channel to increase throughput. Unless otherwise indicated, elements of FIG. 31 having reference characters of the form 31xx correspond to elements of FIG. 27 having reference characters of the form 27xx, and descriptions thereof are therefore omitted in the interest of brevity.

The WAVE2 PPDU 3100 differs from the WAVE2 PPDU 2700 of FIG. 27 in that the DATA field 3126 is not divided into duplicated upper and lower portions. Instead, each of the data subcarriers of the WAVE2 20 MHz numerology may be used to carry unique portions of the information in the DATA field 3126.

FIG. 32 illustrates a WAVE2 PPDU 3200 for communications in a 20 MHz channel, according to an embodiment. The WAVE2 PPDU 3200 uses the 20 MHz channel to increase throughput. Unless otherwise indicated, elements of FIG. 32 having reference characters of the form 32xx correspond to elements of FIG. 28 having reference characters of the form 28xx, and descriptions thereof are therefore omitted in the interest of brevity.

The WAVE2 PPDU 3200 differs from the WAVE2 PPDU 2800 of FIG. 28 in that the DATA field 3226 is not divided into duplicated upper and lower portions. Instead, each of the data subcarriers of the WAVE2 20 MHz numerology may be used to carry unique portions of the information in the DATA field 3226.

FIG. 33 illustrates a WAVE2 PPDU 3300 for communications in a 20 MHz channel, according to an embodiment. The WAVE2 PPDU 3300 uses the 20 MHz channel to increase throughput. Unless otherwise indicated, elements of FIG. 33 having reference characters of the form 33xx correspond to elements of FIG. 29 having reference characters of the form 2xx, and descriptions thereof are therefore omitted in the interest of brevity.

The WAVE2 PPDU 3300 differs from the WAVE2 PPDU 2900 of FIG. 29 in that the DATA field 3326 is not divided into duplicated upper and lower portions. Instead, each of the data subcarriers of the WAVE2 20 MHz numerology may be used to carry unique portions of the information in the DATA field 3326.

In embodiments, when a 20 MHz WAVE2 PPDU includes upper and lower half portions of its Data field, information is included in the PPDU to indicate whether half of data portion contains repeated (A type) or interleaved (B type) information of original information (such as shown in FIGS. 27-29) or non-repeated and non-interleaved (C type) information (such as shown in FIGS. 31-33).

In an embodiment including a 10 MHz PPDU format and one 20 MHz PPDU format, regardless of types above, a first information in a PPDU is a bandwidth (BW) field. For example, if a value of the first information is set to 0, then the PPDU is a 10 MHz WAVE2 PPDU. Otherwise, it is 20 MHz WAVE2 PPDU.

In another embodiment including a 10 MHz PPDU format and several different 20 MHz PPDU formats, the first information may include a type field. For example, if a value of the first information is set to 0, then the PPDU is a 10 MHz WAVE2 PPDU. If a value of the first information is set to 1, then the PPDU is an A type 20 MHz WAVE2 PPDU.

If a value of the first information is set to 2, then the PPDU is a B type 20 MHz WAVE2 PPDU. If a value of the first information is set to 3, then then the PPDU is a C type 20 MHz WAVE2 PPDU.

In another embodiment including a 10 MHz PPDU format and several different 20 MHz PPDU formats, the first information may could be BW field and a second information could be Type field. For example, if a value of the first information sets to 0, then it is 10 MHz WAVE2 PPDU and a value of the second information could be reserved. If a value of the first information is set to 1 and a value of the second information set 0, then the PPDU is an A type 20 MHZ WAVE2 PPDU. If a value of the first information sets to 1 and a value of the second information set 1, then the PPDU is a B type 20 MHZ WAVE2 PPDU. If a value of the first information sets to 1 and a value of the second information set 2, then the PPDU is a C type 20 MHZ WAVE2 PPDU.

In embodiments with more than one 10 MHz PPDU format and more than one 20 MHz PPDU format, Option 2 and Option 3 could be applied to indicate which WAVE2 PPDU type is transmitted. For example, one information field could be used to indicate different type such as 10 MHz 11p type, 10 MHz WAVE2 type (e.g., ac downclocked by 2), 20 MHz A type or 20 MHz C type. For example, two information fields could be used to indicate BW and Type, respectively.

Embodiments disclosed herein provide for improved robustness, improved throughput, or both in a wireless network. Embodiments maintain backward compatibility with a legacy wireless network standard while providing improved performance relative to the legacy wireless network standard. Embodiments enable distinguishing between transmissions according to an evolved wireless network standard and a legacy network standard.

What is claimed is:

1. A method performed by a wireless device, the method comprising:
    generating a first Physical layer Protocol Data Unit (PPDU), the first PPDU including a first data payload;
    generating a second PPDU, the second PPDU including a second data payload;
    transmitting, by the wireless device, the first PPDU using a first band;
    transmitting, by the wireless device simultaneously with transmitting the first PPDU, the second PPDU using a second band,
    wherein the first band is adjacent to the second band,
    wherein the first and second PPDUs are both single-user PPDUs,
    wherein the first PPDU includes a first portion and a second portion,
    wherein the second PPDU includes a first portion and a second portion,
    wherein the second portion of the first PPDU and the second portion of the second PPDU both include decoding information for decoding the first data payload and the second data payload, the decoding information in the first PPDU being identical to the decoding information in the second PPDU,
    wherein the decoding information includes:
        low-density parity-check (LDPC) information that indicates whether LDPC is used with both the first PPDU and the second PPDU,
        bandwidth information that indicates a bandwidth of both the first PPDU and the second PPDU,
        midamble information that indicates a midamble periodicity in both the first PPDU and the second PPDU,
        format information that indicates a format of both the first PPDU and the second PPDU, and
        coding information that indicates coding used for both the first PPDU and the second PPDU,
    wherein the first portion of the first PPDU is transmitted using a first numerology and the second portion of the first PPDU is transmitted using a second numerology,
    wherein the first portion of the second PPDU is transmitted using the first numerology and the second portion of the second PPDU is transmitted using the second numerology,
    wherein the first portion of the first PPDU and the first portion of the second PPDU each include a set of legacy short training symbols, a set of legacy long training symbols, and a set of legacy signal symbols,
    wherein the second portion of the first PPDU and the second portion of the second PPDU share a set of non-legacy signal symbols,
    wherein the second portion of the first PPDU includes the first data payload, and
    wherein the second portion of the second PPDU includes the second data payload.

2. The method of claim 1, wherein the set of legacy signal symbols are encoded using a first constellation mapping, and wherein the set of non-legacy signal symbols are encoded using a second constellation mapping different from the first constellation mapping.

3. The method of claim 2, wherein the first constellation mapping is Binary Phase Shift Keying (BPSK), and wherein the second constellation mapping is Quadrature BPSK (QBPSK) for performing auto-detection of the first PPDU and the second PPDU to indicate a type of the first and second PPDUs.

4. The method of claim 1, wherein the decoding information is included in the set of non-legacy signal symbols.

5. The method of claim 1,
    wherein the first band is 10 MHz and the second band is 10 MHz, and
    wherein the first band is separate from the second band.

6. A non-transitory computer readable medium comprising computer executable instructions which, when executed by one or more processors of a wireless device, cause the wireless device to perform the steps of:
    generating a first Physical layer Protocol Data Unit (PPDU), the first PPDU including a first data payload;
    generating a second PPDU, the second PPDU including a second data payload;
    transmitting, by the wireless device, the first PPDU using a first band;
    transmitting, by the wireless device simultaneously with transmitting the first PPDU, the second PPDU using a second band,
    wherein the first band is adjacent to the second band,
    wherein the first and second PPDUs are both single-user PPDUs,
    wherein the first PPDU includes a first portion and a second portion,
    wherein the second PPDU includes a first portion and a second portion,
    wherein the second portion of the first PPDU and the second portion of the second PPDU both include decoding information for decoding the first data payload and the second data payload, the decoding information in the first PPDU being identical to the decoding information in the second PPDU, wherein the decoding information includes:
- low-density parity-check (LDPC) information that indicates whether LDPC is used with both the first PPDU and the second PPDU,
- bandwidth information that indicates a bandwidth of both the first PPDU and the second PPDU,
- midamble information that indicates a midamble periodicity in both the first PPDU and the second PPDU,
- format information that indicates a format of both the first PPDU and the second PPDU, and
- coding information that indicates coding used for both the first PPDU and the second PPDU, wherein the first portion of the first PPDU is transmitted using a first numerology and the second portion of the first PPDU is transmitted using a second numerology, wherein the first portion of the second PPDU is transmitted using the first numerology and the second portion of the second PPDU is transmitted using the second numerology, wherein the first portion of the first PPDU and the first portion of the second PPDU each include a set of legacy short training symbols, a set of legacy long training symbols, and a set of legacy signal symbols, wherein the second portion of the first PPDU and the second portion of the second PPDU share a set of non-legacy signal symbols, wherein the second portion of the first PPDU includes the first data payload, and wherein the second portion of the second PPDU includes the second data payload.

7. The non-transitory computer readable medium of claim 6,
wherein the decoding information is included in the set of non-legacy signal symbols.

8. The non-transitory computer readable medium of claim 7, wherein the set of legacy signal symbols are encoded using a first constellation mapping, and wherein the set of non-legacy signal symbols are encoded using a second constellation mapping different from the first constellation mapping.

9. The non-transitory computer readable medium of claim 6, wherein the first band is 10 MHz and the second band is 10 MHz, and
wherein the first band is separate from the second band.

10. A non-transitory computer readable medium comprising computer executable instructions which, when executed by one or more processors of a wireless device, cause the wireless device to perform the steps comprising:
- generating a first Physical layer Protocol Data Unit (PPDU), the first PPDU including a first data payload;
- generating a second PPDU, the second PPDU including a second data payload;
- transmitting, by the wireless device, the first PPDU using a first band; and
- transmitting, by the wireless device simultaneously with transmitting the first PPDU, the second PPDU using a second band, wherein the first band is adjacent to the second band,
wherein the first and second PPDUs are both single-user PPDUs, wherein the first PPDU includes a first portion and a second portion,
wherein the second PPDU includes a first portion and a second portion,
wherein the second portion of the first PPDU and the second portion of the second PPDU both include information for decoding the first data payload and the second data payload,
wherein the information includes: low-density parity-check (LDPC) information that indicates whether LDPC is used with the first PPDU and the second PPDU, bandwidth information that indicates a bandwidth of the first PPDU and the second PPDU, midamble information that indicates a midamble periodicity in the first PPDU and the second PPDU, format information that indicates a format of the first PPDU and the second PPDU, and coding information that indicates coding used for the first PPDU and the second PPDU, wherein the first portion of the first PPDU is transmitted using a first numerology and the second portion of the first PPDU is transmitted using a second numerology, wherein the first portion of the second PPDU is transmitted using the first numerology and the second portion of the second PPDU is transmitted using the second numerology, wherein the first portion of the first PPDU and the first portion of the second PPDU each include a set of legacy short training symbols, a set of legacy long training symbols, and a set of legacy signal symbols, wherein the second portion of the first PPDU and the second portion of the second PPDU share a set of non-legacy signal symbols, wherein the second portion of the first PPDU includes the first data payload, and wherein the second portion of the second PPDU includes the second data payload.

11. The non-transitory computer readable medium of claim 10, wherein the first portion of the first PPDU and the first portion of the second PPDU each include a set of legacy short training symbols, a set of legacy long training symbols, and a set of legacy signal symbols,
wherein the second portion of the first PPDU includes a set of non-legacy signal symbols and the first data payload,
wherein the second portion of the second PPDU includes the set of non-legacy signal symbols and the second data payload, and
wherein the information is included in the set of non-legacy signal symbols.

12. The non-transitory computer readable medium of claim 11, wherein the set of legacy signal symbols are encoded using a first constellation mapping, and wherein the set of non-legacy signal symbols are encoded using a second constellation mapping different from the first constellation mapping.

13. The non-transitory computer readable medium of claim 10, wherein the first band is 10 MHz and the second band is 10 MHz, and
wherein the first band is separate from the second band.

* * * * *